US006063173A

United States Patent [19]

Torii et al.

[11] Patent Number: 6,063,173

[45] Date of Patent: May 16, 2000

[54] REVERSIBLE THERMOSENSITIVE COLORING COMPOSITION AND REVERSIBLE THERMOSENSITIVE RECORDING MEDIUM USING THE SAME

[75] Inventors: Masafumi Torii, Shizuoka; Hiromi Furuya; Masaru Shimada, both of Shizuoka-ken; Kyoji Tsutsui, Mishima, all of Japan

[73] Assignee: Ricoh Company, Ltd., Tokyo, Japan

[21] Appl. No.: 09/237,808

[22] Filed: Jan. 27, 1999

Related U.S. Application Data

[62] Division of application No. 08/710,718, Sep. 20, 1996, Pat. No. 5,932,516.

[30] Foreign Application Priority Data

Sep. 21, 1995 [JP] Japan .................................... 7-266186
Sep. 3, 1996 [JP] Japan .................................... 8-250824

[51] Int. Cl.[7] .................................................. C09D 11/00

[52] U.S. Cl. .................................... 106/31.17; 106/31.18; 106/31.23

[58] Field of Search ............................. 106/31.17, 31.18, 106/31.23

[56] References Cited

U.S. PATENT DOCUMENTS

| | | | |
|---|---|---|---|
| 5,185,194 | 2/1993 | Miyake et al. | 428/195 |
| 5,296,439 | 3/1994 | Maruyama et al. | 503/201 |
| 5,395,433 | 3/1995 | Maruyama et al. | 106/31.17 |
| 5,395,815 | 3/1995 | Ikeda et al. | 503/216 |
| 5,403,810 | 4/1995 | Sawamura et al. | 106/31.17 |
| 5,432,534 | 7/1995 | Maruyama et al. | 347/172 |
| 5,482,912 | 1/1996 | Furuya et al. | 503/207 |
| 5,521,138 | 5/1996 | Shimada et al. | 106/31.17 |
| 5,547,500 | 8/1996 | Tsutsui | 106/31.17 |
| 5,622,909 | 4/1997 | Furuya et al. | 503/216 |
| 5,641,724 | 6/1997 | Yamaguchi et al. | 503/221 |
| 5,866,505 | 2/1999 | Furuya et al. | 503/201 |
| 5,868,821 | 2/1999 | Torii et al. | 106/31.17 |
| 5,932,516 | 8/1999 | Torii et al. | 503/216 |
| 6,001,159 | 12/1999 | Furuya et al. | 106/31.17 |

*Primary Examiner*—Helene Klemanski
*Attorney, Agent, or Firm*—Oblon, Spivak, McClelland, Maier & Neustadt, P.C.

[57] ABSTRACT

A reversible thermosensitive coloring composition is provided, which contains (a) an electron-donating coloring compound; and (b) an electron-accepting compound, which is an aromatic carboxylic acid compound comprising at least one hydrocarbon group, which induces color formation in the electron-donating coloring compound. The reversible thermosensitive coloring composition reversibly assumes a color-developed state or a decolorized state, in response to at least one of (1) the temperature thereof when heated and (2) the cooling rate of the reversible thermosensitive coloring composition when cooled after the heating thereof. A reversible thermosensitive recording medium using the coloring composition is also provided.

11 Claims, 1 Drawing Sheet

REVERSIBLE THERMOSENSITIVE COLORING COMPOSITION AND REVERSIBLE THERMOSENSITIVE RECORDING MEDIUM USING THE SAME

This application is a Division of application Ser. No. 08/710,718 Filed on Sep. 20, 1996, now U.S. Pat. No. 5,932,516.

BACKGROUND OF THE INVENTION

1. Field of the Invention

The present invention relates to a reversible thermosensitive coloring composition comprising an electron-donating compound and an electron-accepting compound, capable of inducing color formation using a coloring reaction between the electron-donating compound and the electron-accepting compound. The present invention also relates to a reversible thermosensitive recording medium comprising the reversible thermosensitive coloring composition, which recording medium is capable of reversibly forming a colored image therein and erasing the same therefrom by controlling thermal energy applied thereto.

2. Discussion of Background

There is conventionally known a thermosensitive recording medium which uses the coloring reaction between an electron-donating compound (hereinafter referred to as a coloring agent) and an electron-accepting compound (hereinafter referred to as a color developer). This kind of thermosensitive recording medium is widely used, for example, for facsimile apparatus, word processors, and printers for use with instruments for performing scientific measurements.

However, the coloring reaction of a conventional thermosensitive recording medium of this type currently used in practice has no reversibility, so that color development and decolorization cannot be alternately repeated.

Among published patents, there are several proposals for a thermosensitive recording medium which can reversibly carry out the color development and decolorization using a coloring reaction between a coloring agent and a color developer. For example, a thermosensitive recording medium using phloroglucinol and gallic acid in combination as color developers is disclosed in Japanese Laid-Open Patent Application 60-193691.

In Japanese Laid-Open Patent Application 61-237684, there is disclosed a reversible thermosensitive recording medium which employs as a color developer a compound such as phenolphthalein or thymolphthalein.

In Japanese Laid-Open Patent Applications 62-138556, 62-138568 and 62-140881, there are disclosed reversible thermosensitive recording media, each comprising a recording layer which contains a homogeneously dissolved composition of a coloring agent, a color developer and a carboxylic acid ester.

Furthermore, in Japanese Laid-Open Patent Application 63-173684, there is disclosed a reversible thermosensitive recording medium which comprises as a color developer an ascorbic acid derivative.

In addition, in Japanese Laid-Open Patent Applications 2-188293 and 2-188294, there is disclosed a reversible thermosensitive recording medium which comprises as a color developer a salt of bis(hydroxy-phenyl)acetic acid or gallic acid, and a higher aliphatic amine.

In the above-mentioned conventional reversible thermosensitive recording media, however, the requirements that the colored image be stable and that the decolorization of the colored image be easy are not always satisfied at the same time, and there are still unsolved problems with respect to the density of the colored image, and also with respect to the stability of the repetition of color development and decolorization operations. Therefore, the conventional reversible recording media are not satisfactory for practical use.

The inventors of the present invention have previously proposed in Japanese Laid-Open Patent Application 5-124360 a reversible thermosensitive coloring composition which comprises as a color developer an organic phosphoric acid compound, an aliphatic carboxylic acid compound or a phenolic compound, each having a long-chain aliphatic hydrocarbon group therein, and as a coloring agent a leuco dye. When such a reversible thermosensitive coloring composition is used, color development and decolorization can be easily carried out by controlling the heating and cooling conditions for the coloring composition, and further, the color-developed state and the decolorized state can be stably maintained at room temperature, and the color development and the decolorization can be reversibly repeated.

In the above-mentioned application, there is also proposed a reversible thermosensitive recording medium which comprises a recording layer containing the above-mentioned reversible thermosensitive coloring composition.

This kind of reversible thermosensitive recording medium attains a practically usable level with respect to the balance between the stability and the ease of decolorization of a colored image, and also with respect to the density of a colored image. However, there is yet much room for further improvement of the coloring composition with respect to the color development and decolorization properties thereof and the broadening of the range of the operating conditions under which the coloring composition can be used.

In Japanese Laid-Open Patent Application 6-210954, a phenolic compound having a specific structure including a long-chain aliphatic hydrocarbon group is proposed as a color developer. However, a reversible thermosensitive recording medium comprising the above-mentioned phenolic compound has the same drawbacks as mentioned above.

SUMMARY OF THE INVENTION

It is therefore a first object of the present invention to provide a reversible thermosensitive coloring composition capable of stably maintaining a color-developed or a decolorized state, and promptly assuming the decolorized state from the color-developed state.

A second object of the present invention is to provide a reversible thermosensitive recording medium capable of stably maintaining a color-developed or a decolorized state, and coping with high speed decolorization operation.

The first object of the present invention can be achieved by a reversible thermosensitive coloring composition comprising (a) an electron-donating coloring compound and (b) an electron-accepting compound, which is an aromatic carboxylic acid compound comprising at least one hydrocarbon group, which induces color formation in the electron-donating coloring compound; capable of reversibly assuming a color-developed state or a decolorized state, in response to at least one of (1) the temperature of the reversible thermosensitive coloring composition when heated and (2) the cooling rate of the reversible thermosensitive coloring composition when cooled after the heating thereof.

The second object of the present invention can be achieved by a reversible thermosensitive recording medium comprising a support, and a thermosensitive recording layer formed thereon comprising the above-mentioned reversible thermosensitive coloring compositions.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
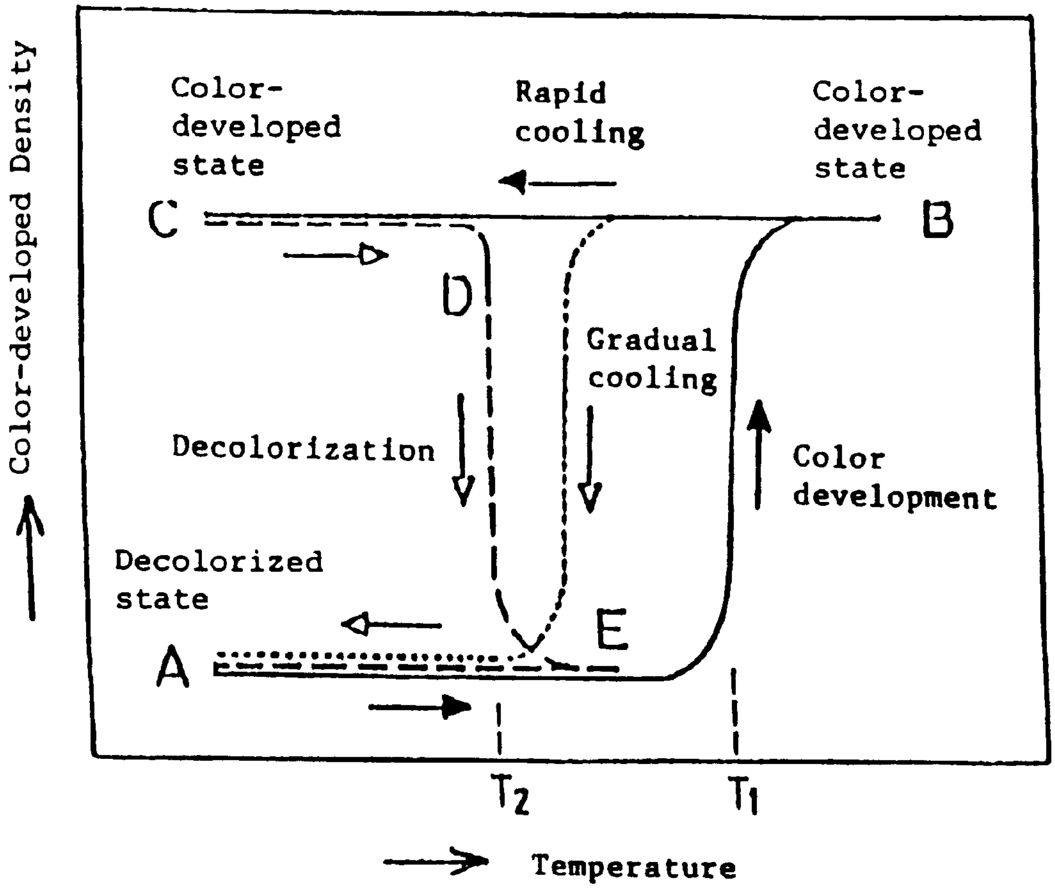
FIG. 1 is a diagram showing the color development and decolorization properties of a reversible thermosensitive coloring composition of the present invention depending on the temperature thereof.

The inventors of the present invention have speculated that in a reversible thermosensitive coloring composition comprising (a) an electron-donating compound serving as a coloring agent and (b) an electron-accepting compound having a hydrocarbon group, which is capable of inducing color formation in the electron-donating compound and therefore serves as a color developer for the electron-donating compound, the balance between the performance of the electron-accepting compound of inducing color formation in the electron-donating compound and the cohesive force of the molecules of these compounds is important in the reversible coloring and decolorization phenomenon of the reversible thermosensitive coloring composition.

Based on such speculation, various compounds have been tested as such color developers. As a result, aromatic carboxylic acid compounds with particular structures have been discovered as useful color developers for use in the above-mentioned reversible thermosensitive coloring composition, which are free of the shortcomings of conventional developers. The present invention is based on this discovery.

More specifically, a reversible thermosensitive coloring composition of the present invention comprises (a) an electron-donating coloring compound; and (b) an electron-accepting compound, which is an aromatic carboxylic acid compound comprising at least one hydrocarbon group, capable of inducing color formation in the electron-donating coloring compound.

The reversible thermosensitive coloring composition of the present invention is capable of reversibly assuming a color-developed state or a decolorized state, depending upon the temperature of the reversible thermosensitive coloring composition when heated and/or depending upon the cooling rate of the reversible thermosensitive coloring composition when cooled after the heating thereof.

It is preferable that such an aromatic carboxylic acid compound comprise at least one hydrocarbon group. It is more preferable that the hydrocarbon group comprise an aliphatic hydrocarbon main chain moiety having at least 8 carbon atoms.

Preferable examples of such aromatic carboxylic acid compounds for use as the electron-donating compounds in the present invention are those of formulae (I), (II) and (III):

(I)

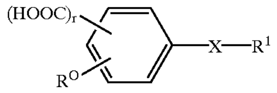

wherein r is an integer of 1 or 2; X is a bivalent group comprising at least one moiety selected from the group consisting of —NH—, —O—, —S—, —CO—, —CS— and —$SO_2$—; $R^0$ is hydroxyl group, an alkyl group having 1 to 6 carbon atoms, an alkoxyl group having 1 to 6 carbon atoms, a halogen atom, or a hydrogen atom; and $R^1$ is an unsubstituted or substituted aliphatic hydrocarbon group comprising an aliphatic hydrocarbon main chain moiety having at least 8 non-aromatic carbon atoms.

The aliphatic hydrocarbon main chain moiety may further comprise an aromatic ring.

(II)

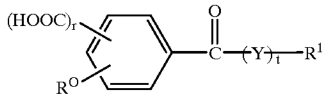

wherein r is an integer of 1 or 2; t is an integer of 0 or 1; Y is a bivalent group comprising at least one moiety selected from the group consisting of —NH—, —S—, —CO—, —CS— and —$SO_2$—; $R^0$ is hydroxyl group, an alkyl group having 1 to 6 carbon atoms, an alkoxyl group having 1 to 6 carbon atoms, a halogen atom, or a hydrogen atom; and $R^1$ is an unsubstituted or substituted aliphatic hydrocarbon group comprising an aliphatic hydrocarbon main chain moiety having at least 8 non-aromatic carbon atoms. The aliphatic hydrocarbon main moiety may further comprise an aromatic ring.

(III)

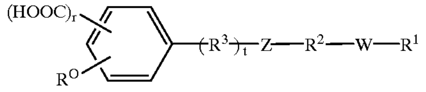

wherein r is an integer of 1 or 2; t is an integer of 0 or 1; Z and W are each independently a bivalent hetero-atom-containing group; $R^0$ is hydroxyl group, an alkyl group having 1 to 6 carbon atoms, an alkoxyl group having 1 to 6 carbon atoms, a halogen atom, or a hydrogen atom; and $R^1$, $R^2$ and $R^3$ are each independently an unsubstituted or substituted hydrocarbon group.

It is preferable that the unsubstituted or substituted hydrocarbon group represented by $R^1$, $R^2$ or $R^3$ comprise an aliphatic hydrocarbon main chain moiety having at least 8 non-aromatic carbon atoms.

The hydrocarbon main chain moiety may further comprise an aromatic ring.

The above-mentioned aromatic carboxylic acid compound of formula (I) will now be explained in detail.

For preventing or minimizing the deterioration of the color development stability and the decolorization characteristics of the coloring composition, it is preferable that $R^1$ in formula (I) be an unsubstituted or substituted hydrocarbon group, which preferably comprises as a main chain thereof an aliphatic hydrocarbon moiety of at least 8 non-aromatic carbons atoms, more preferably at least 11 non-aromatic carbon atoms. The hydrocarbon moiety may further comprise an aromatic ring.

The hydrocarbon group represented by $R^1$ may be a straight-chain or branched hydrocarbon group which may include an unsaturated bond therein.

Examples of substituents of the hydrocarbon group represented by $R^1$ are hydroxyl group, a halogen atom and an alkoxyl group.

Preferable examples of the hydrocarbon group represented by $R^1$ in formula (I) are as follows:

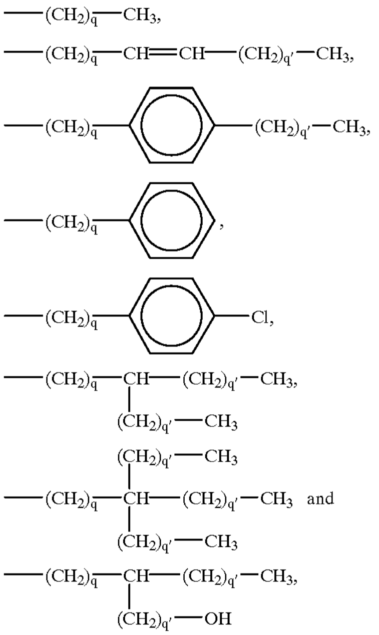

wherein q, q', q" and q'" are each independently such an integer that satisfies the above-mentioned requirement that the main chain thereof be a hydrocarbon moiety of at least 8 non-aromatic carbon atoms.

For example, X in formula (I) is a bivalent group which comprises at least one moiety selected from the group consisting of:

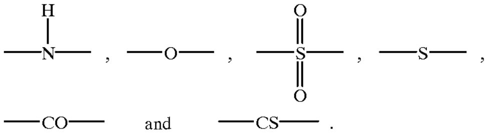

Specific examples of the bivalent group represented by X are as follows:

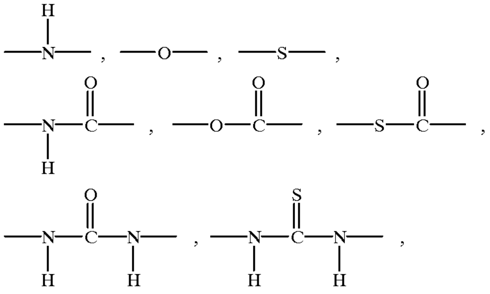

-continued

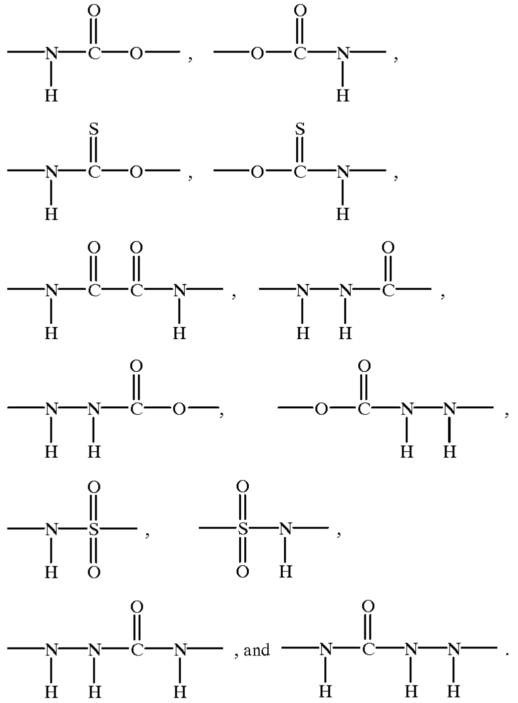

Preferable examples of aromatic carboxylic acid compounds represented by formula (I) serving as color developers for use in the present invention are as follows:

(1)

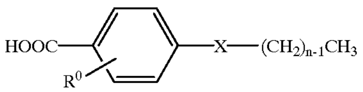

(2)

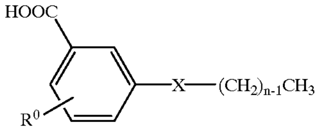

(3)

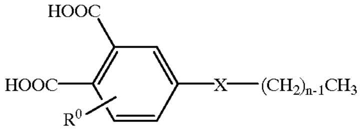

(4)

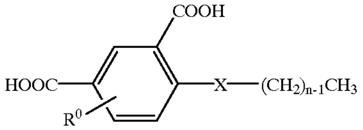

wherein $R^0$, X are the same as defined above; and n is an integer of 8 to 22.

Specific examples of the aromatic carboxylic acid compounds of formula (1) are shown in Table 1:

TABLE 1

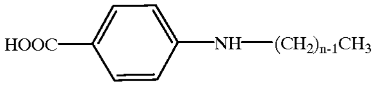

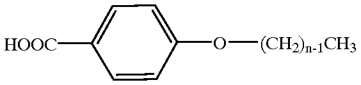

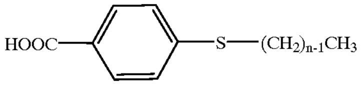

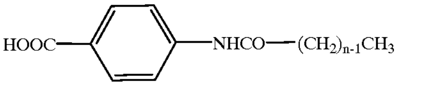

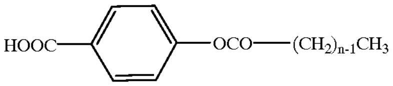

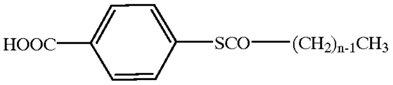

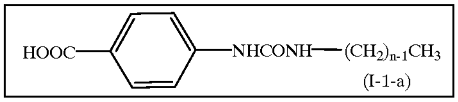
(I-1-a)

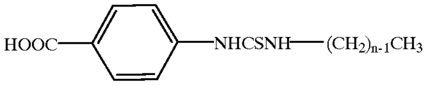

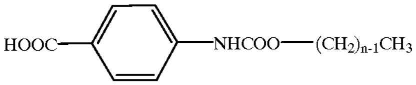

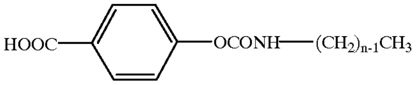

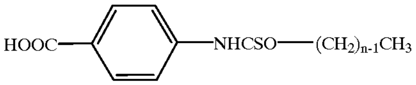

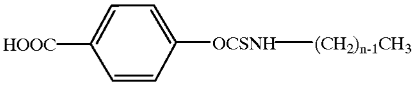

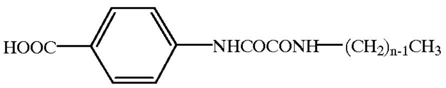

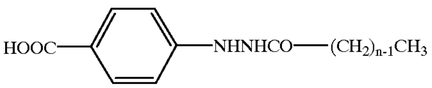

TABLE 1-continued

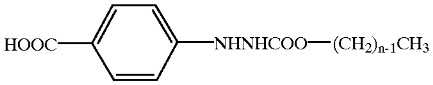

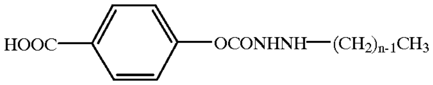

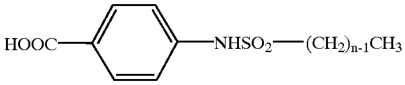

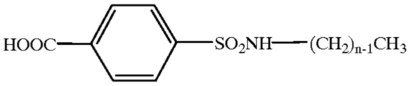

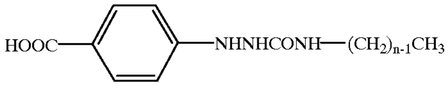

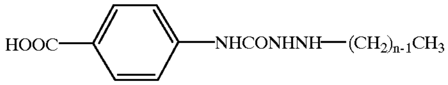

X in formulae (2) to (4) may be the same as shown in Table 1, but is not limited to those shown in Table 1 in the present invention.

Taking as an example the compound of formula (I-1-a) shown in Table 1, specific examples of compounds represented by formula (I-1-a) that can be used as color developers are shown in Table 2, but the color developers for use in the present invention are not limited to such compounds.

TABLE 2

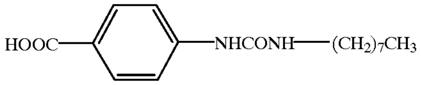

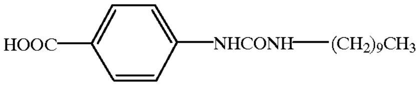

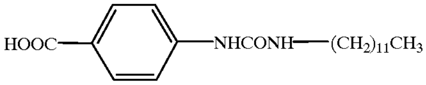

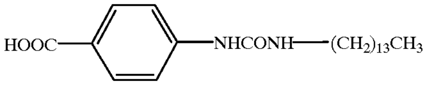

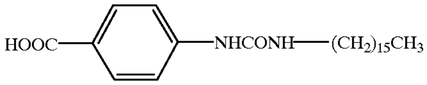

TABLE 2-continued

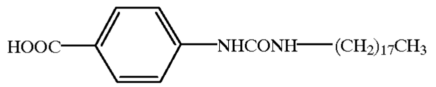

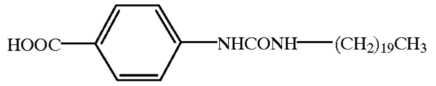

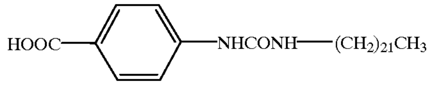

The aromatic carboxylic acid compound of formula (II) will now be explained in detail:

II

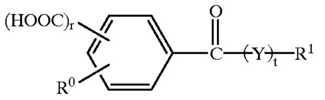

wherein r is an integer of 1 or 2; t is an integer of 0 or 1; Y is a bivalent group comprising at least one moiety selected from the group consisting of —NH—, —S—, —CO—, —CS— and —$SO_2$—; $R^0$ is hydroxyl group, an alkyl group having 1 to 6 carbon atoms, an alkoxyl group having 1 to 6 carbon atoms, a halogen atom, or a hydrogen atom; and $R^1$ is an unsubstituted or substituted hydrocarbon group comprising an aliphatic hydrocarbon main chain moiety having at least 8 non-aromatic carbon atoms. The hydrocarbon moiety may further comprise an aromatic ring.

$R^1$ in formula (II) may be the same groups as defined in the above-mentioned formula (I).

Specific examples of the bivalent group represented by Y in formula (II) are as follows:

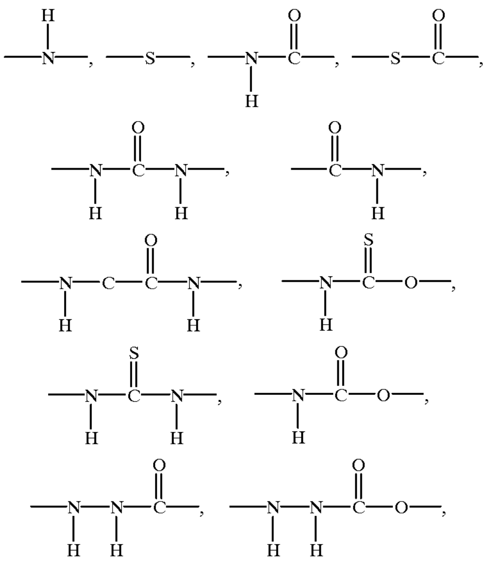

-continued

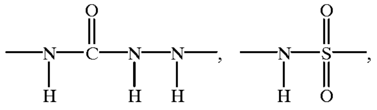

and

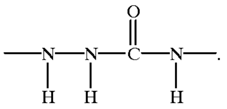

Preferable examples of aromatic carboxylic acid compounds represented by formula (II) serving as color developers for use in the present invention are those represented by the following formula (5) or (6):

(5)

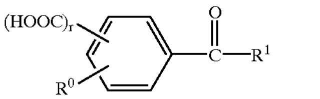

(6)

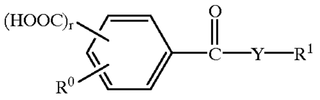

wherein r, $R^0$ and $R^1$ are respectively the same as those defined in formula (I).

In particular, the aromatic carboxylic acid compounds with the following structures represented by formulae (7) to (14) are further more preferable for use in the present invention:

(7)

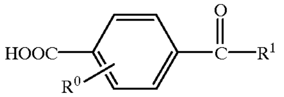

(8)

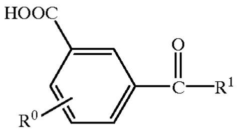

(9)

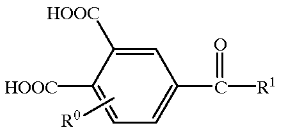

(10)

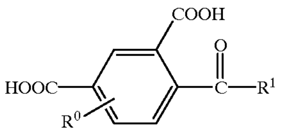

(11)

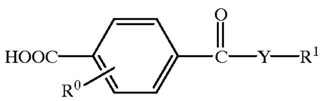

-continued

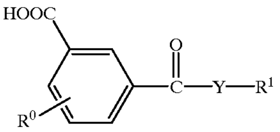

(12)

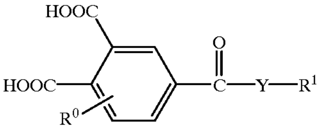

(13)

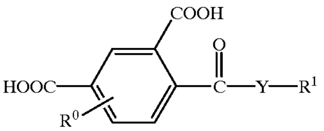

(14)

Specific examples of aromatic carboxylic acid compounds with the structure of the above-mentioned formula (11) are shown in Table 3:

TABLE 3

| |
|---|
| 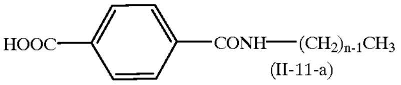 (II-11-a) |
| 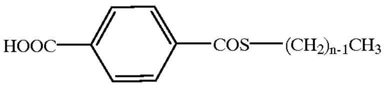 |
| 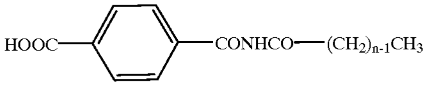 |
| 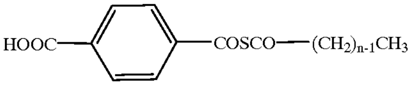 |
| 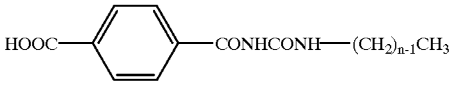 |
| 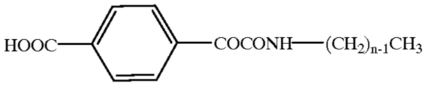 |
|  |
| 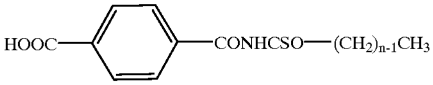 |

TABLE 3-continued

| |
|---|
| 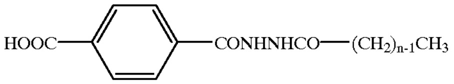 |
|  |
|  |
| 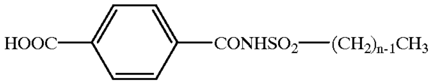 |
|  |

Specific examples of $R^0$, $R^1$ and Y in the compounds of formulae (7) to (10) and (12) to (14) may respectively be the same as the corresponding moieties specifically shown for the compound of formula (11) in Table 3.

Taking as an example the compound of formula (II-11-a) shown in Table 3, specific examples of compounds represented by formula (II-11-a) that can be used as color developers for use in the present invention are shown in Table 4:

TABLE 4

| |
|---|
| 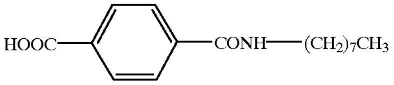 |
| 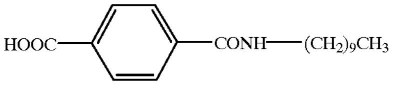 |
| 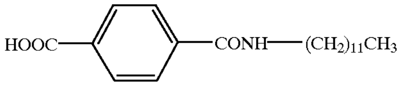 |
| 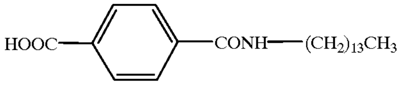 |
| 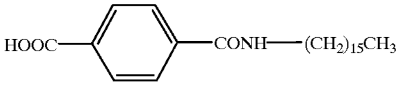 |
| 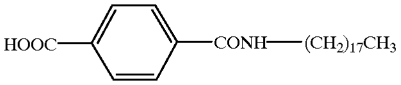 |

TABLE 4-continued

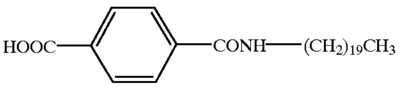

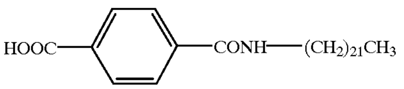

The aromatic carboxylic acid compound of formula (III) will now be explained in detail:

(III)

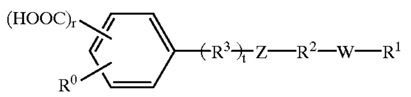

wherein r is an integer of 1 or 2; t is an integer of 0 or 1; Z and W are each independently a bivalent hetero-atom-containing group; $R^0$ represents hydroxyl group, an alkyl group having 1 to 6 carbon atoms, an alkoxyl group having 1 to 6 carbon atoms, a halogen atom, or a hydrogen atom; and $R^1$, $R^2$ and $R^3$ are each independently an unsubstituted or substituted hydrocarbon group.

For preventing or minimizing the deterioration of the color development stability and the decolorization characteristics of the coloring composition, it is preferable that the unsubstituted or substituted hydrocarbon group represented by $R^1$, $R^2$ or $R^3$ comprise as a main chain thereof a hydrocarbon moiety of at least 8 non-aromatic carbon atoms, more preferably at least 11 non-aromatic carbon atoms. The hydrocarbon moiety may further comprise an aromatic ring therein.

The hydrocarbon group represented by $R^1$, $R^2$ or $R^3$ may be a straight-chain or branched aliphatic hydrocarbon group which may include an unsaturated bond therein.

Examples of substituents of $R^1$, $R^2$ or $R^3$ are hydroxyl group, a halogen atom or an alkoxyl group.

Preferable examples of the aliphatic hydrocarbon group represented by $R^2$ or $R^3$ in formula (III) are as follows:

$-(CH_2)_q-$, $-(CH_2)_q-CH{=}CH-(CH_2)_{q'}-$,

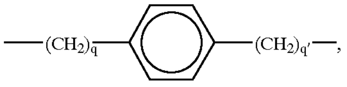

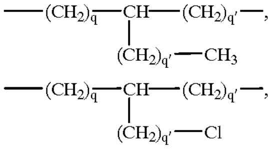

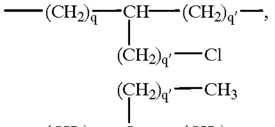

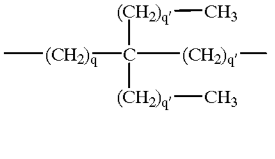

and

-continued

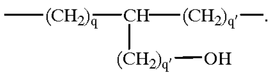

wherein q, q', q" and q'" are each independently such an integer that satisfies the above-mentioned requirement that the main chain thereof be a hydrocarbon moiety of at least 8 non-aromatic carbon atoms.

Examples of $R^1$ in formula (III) may be the same as defined in formula (I).

Z and W in formula (III) are each a bivalent hetero-atom-containing group. It is preferable that the bivalent hetero-atom-containing group comprise at least one moiety selected from the group consisting of

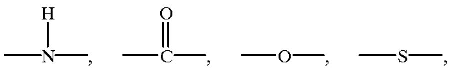

and

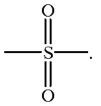

Specific examples of the bivalent hetero-atom containing group represented by Z or W are as follows:

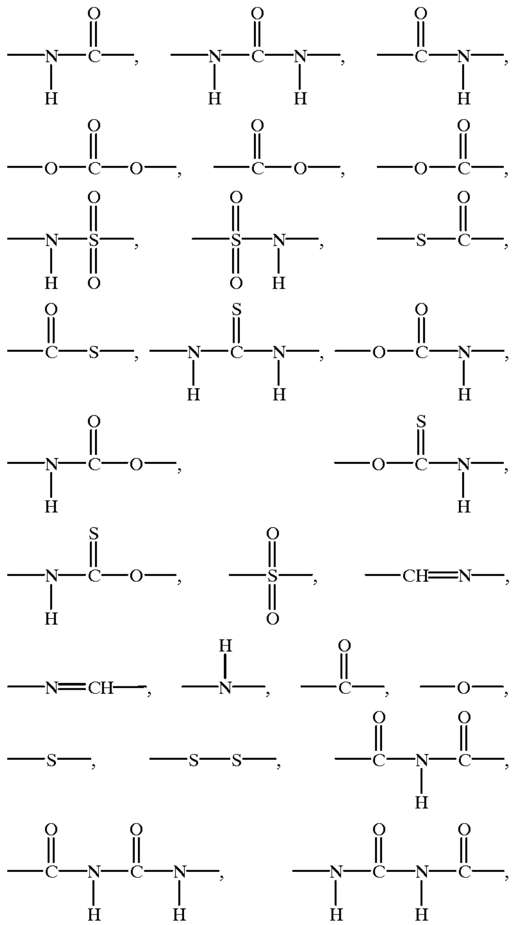

-continued

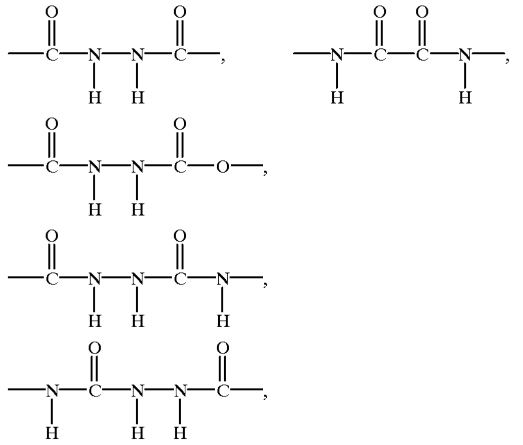

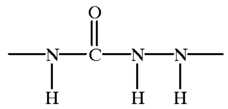

and

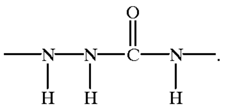

Further, W in formula (III) may be a bivalent group comprising any of the above-mentioned hetero-atom-containing moieties via a hydrocarbon group such as an alkylene group, for example, as represented by the following formula (IV):

$$W: —W^0—(R^4\text{-}W^1)_p— \quad \text{(IV)}$$

wherein $R^4$ is the same as $R^2$ which is the above-mentioned bivalent hydrocarbon group; $W^0$ and $W^1$ are each independently the same as W which is the above-mentioned bivalent hetero-atom containing group; and p is an integer of 1 to 4, and when p is 2 or more, $R^4$ and $W^1$ may be the same or different.

Preferable examples of the aromatic carboxylic acid compounds of formula (III) serving as color developers for use in the present invention are those represented by the following formulae (15) to (18):

(15)

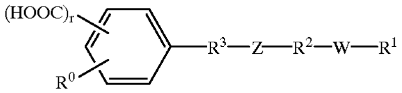

(16)

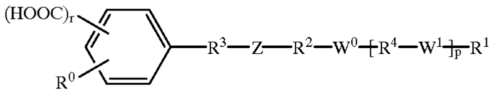

(17)

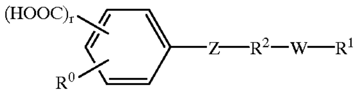

(18)

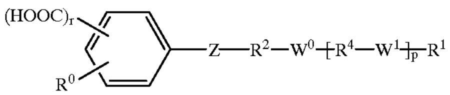

wherein $R^0$ to $R^4$, Z, W, $W^0$, $W^1$, r and p are respectively the same as defined above.

Particulary preferable examples of the aromatic carboxylic acid compounds of formula (III) serving as color developers for use in the present invention are those represented by the following formulae (19) to (34):

(19)

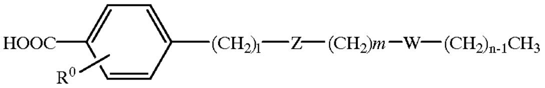

(20)

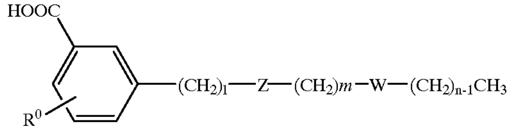

(21)

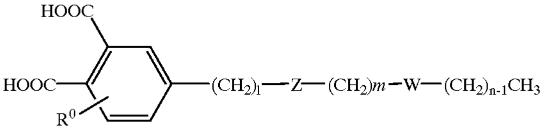

(22)

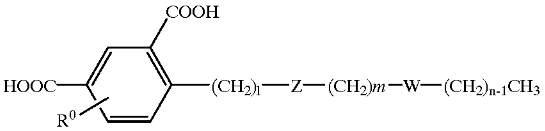

(23)

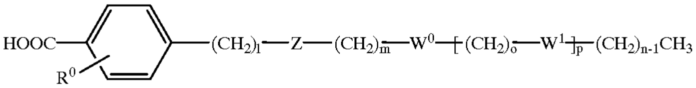

-continued
(24)
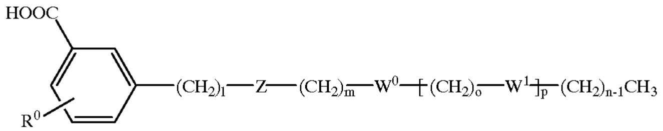
(25)
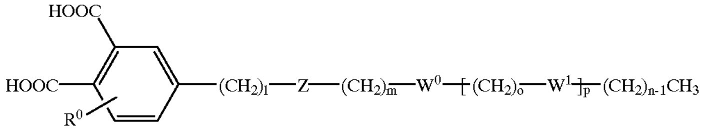
(26)
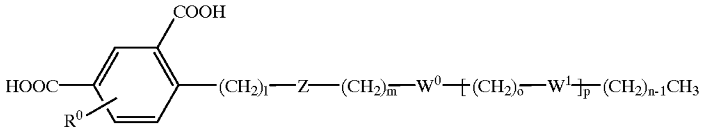
(27)
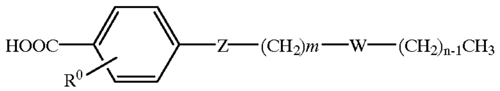
(28)
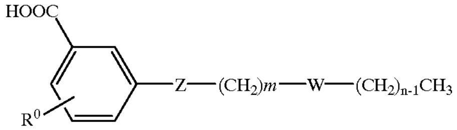
(29)
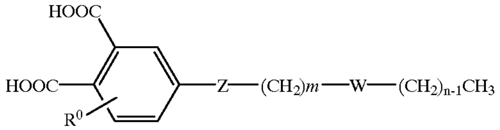
(30)
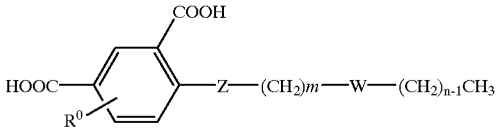
(31)
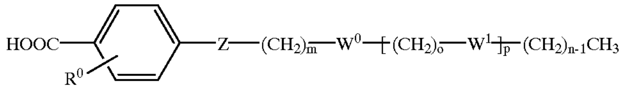
(32)
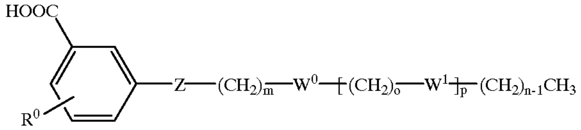
(33)
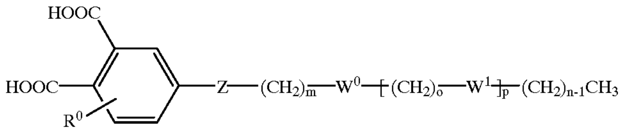

-continued (34)

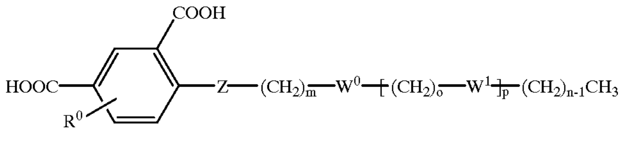

wherein l, m, n and o are each independently an integer of 1 to 22, provided that l+m+n+o≧8; and p is an integer of 1 to 4, provided that when p is 2 or more, o may be the same or different integer and $W^1$ may be the same or different hetero-atom containing moiety.

Specific examples of the above-mentioned aromatic carboxylic acid compounds of formula (27) are shown in the following Table 5:

TABLE 5

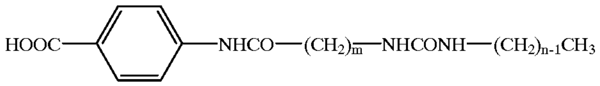

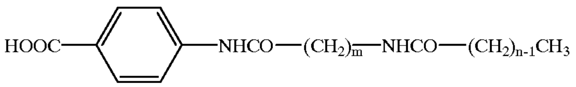

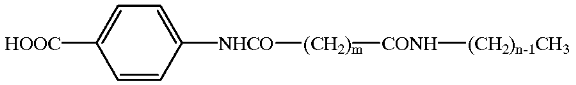

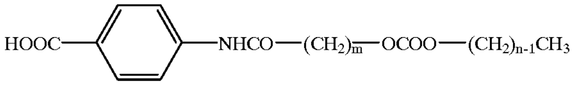

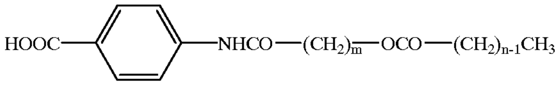

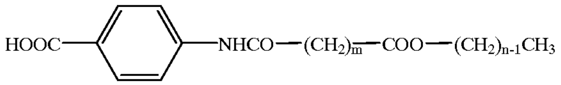

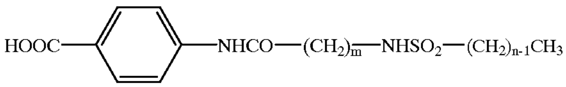

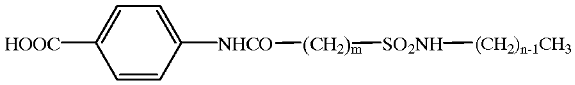

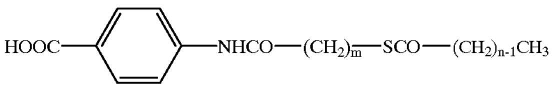

TABLE 5-continued
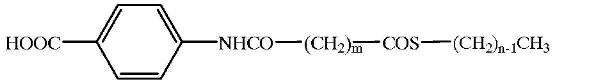
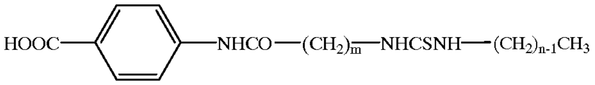
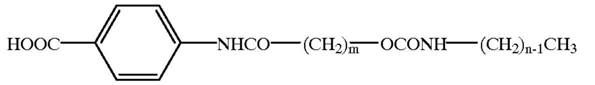
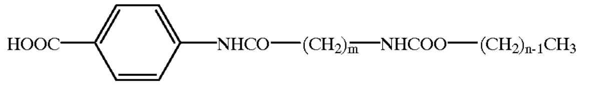
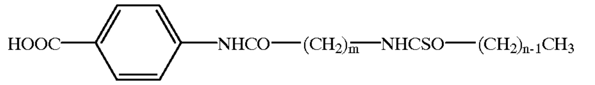
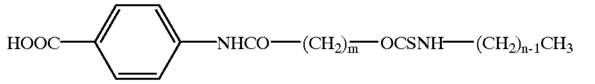
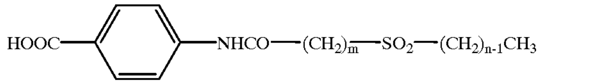
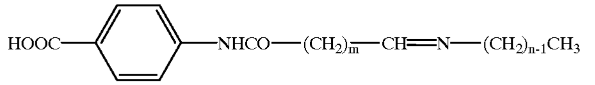
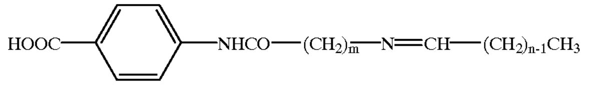
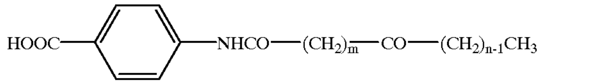
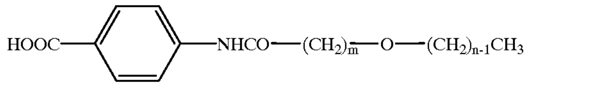
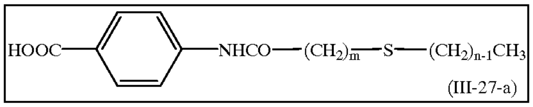
(III-27-a)
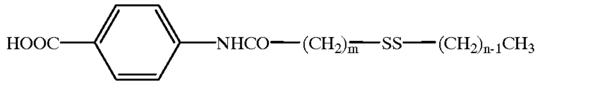
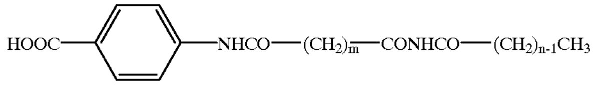

TABLE 5-continued
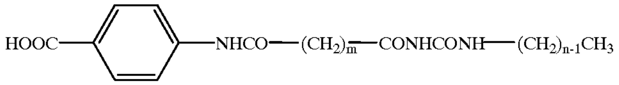
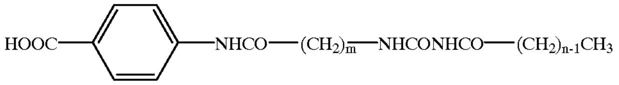
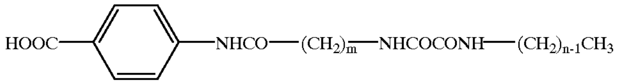
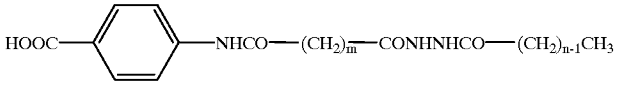
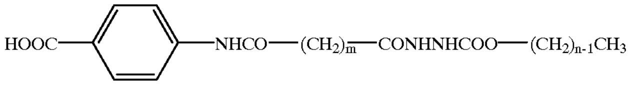
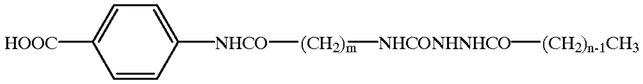
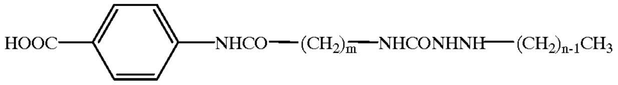
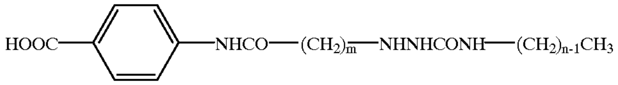
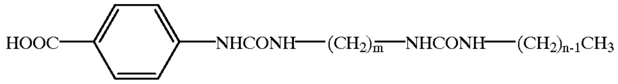
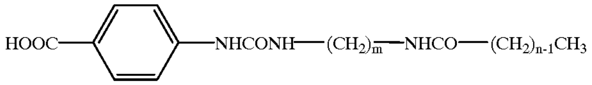
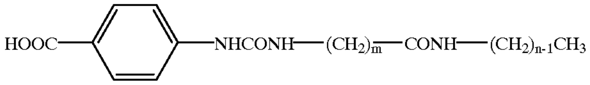
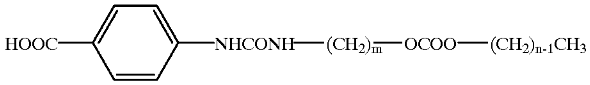
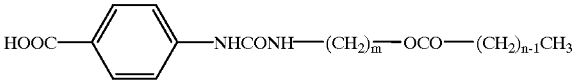
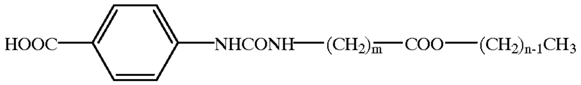

TABLE 5-continued
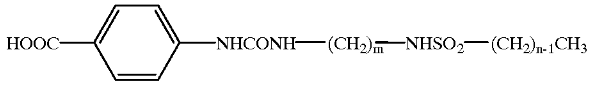
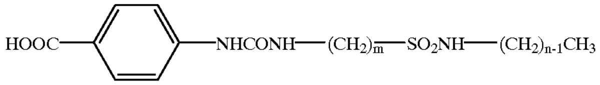
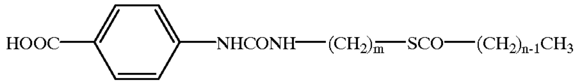
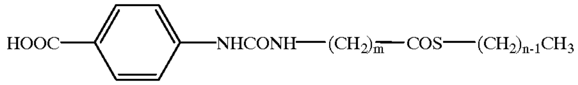
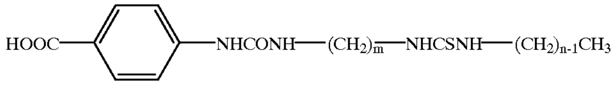
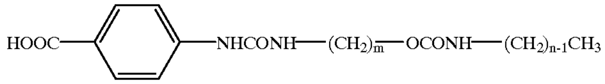
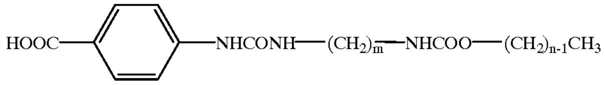
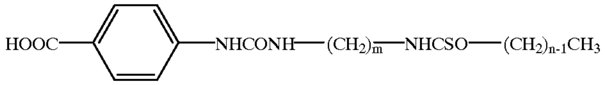
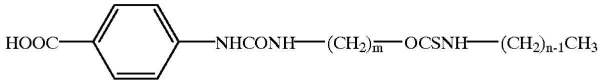
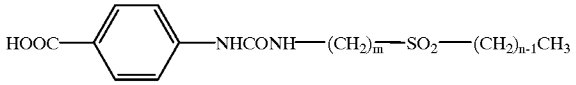
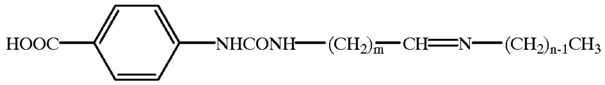
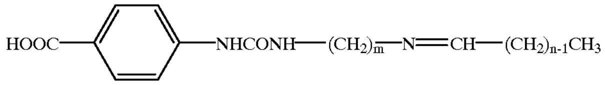
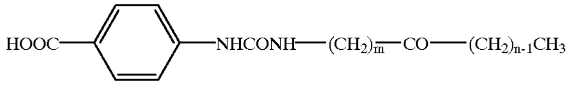
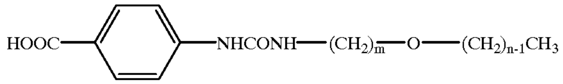

TABLE 5-continued
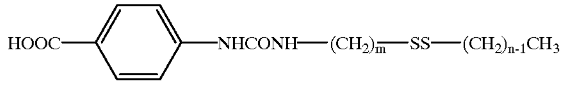
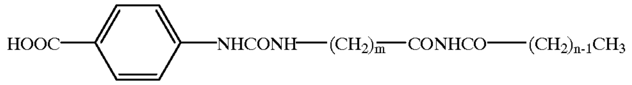
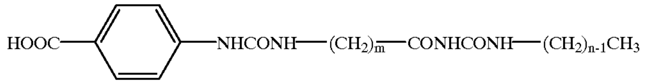
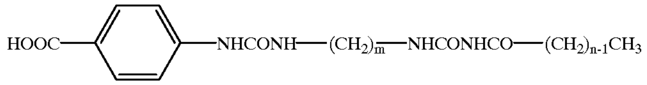
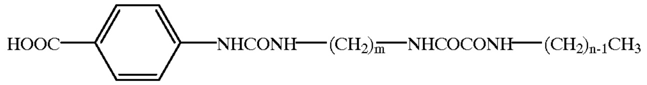
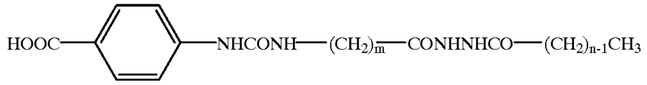
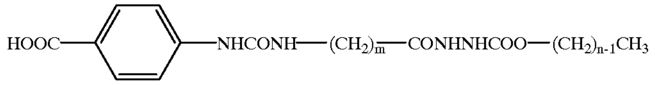
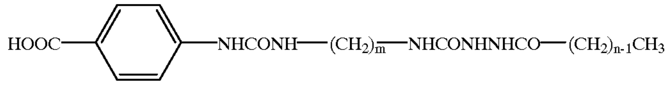
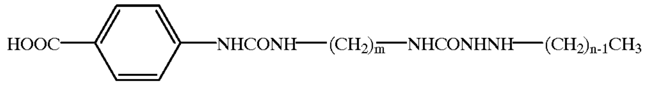
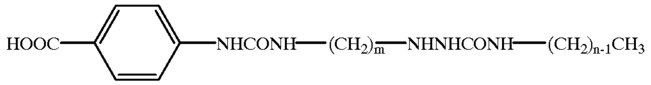
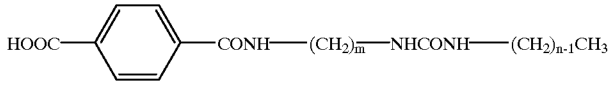
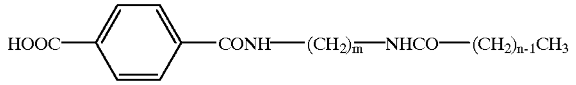
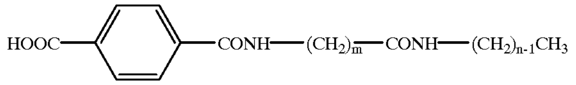

TABLE 5-continued
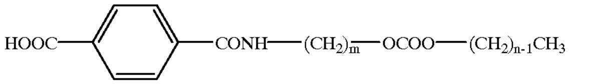
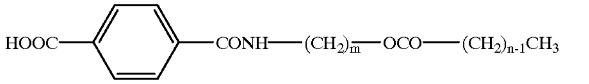
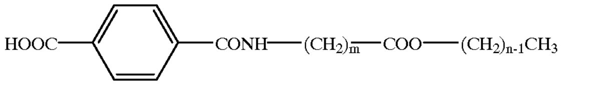
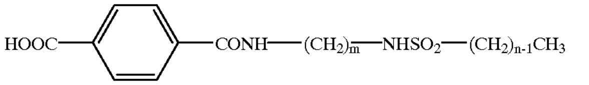
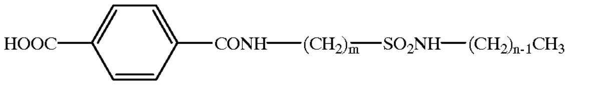
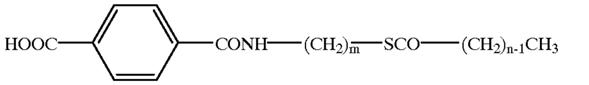
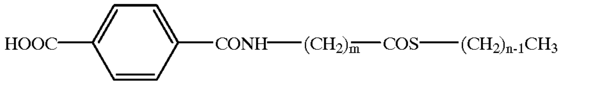
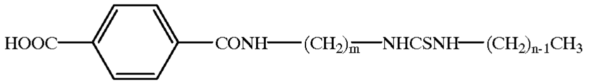
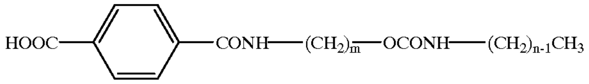
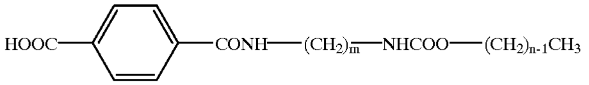
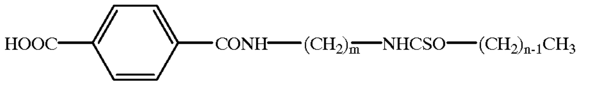
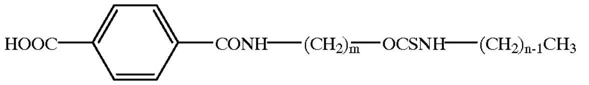
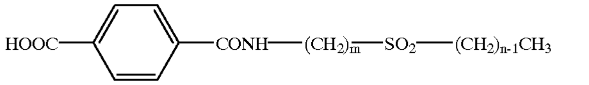
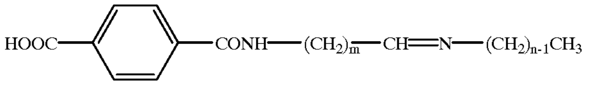

TABLE 5-continued
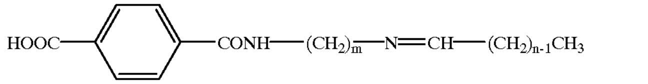
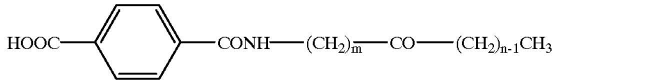
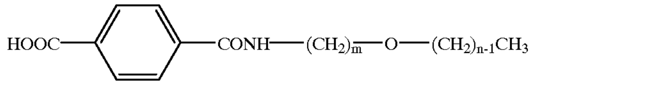
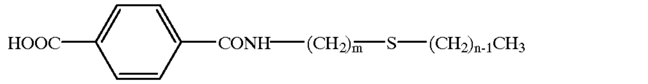
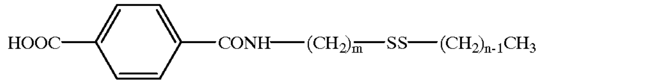
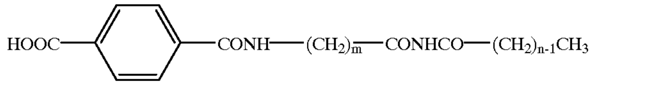
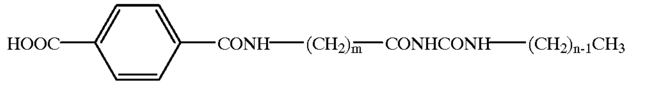
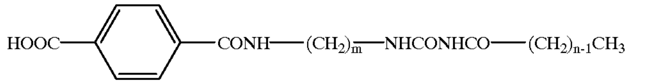
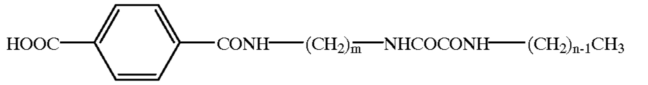
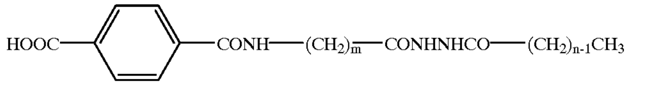
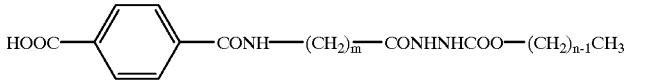
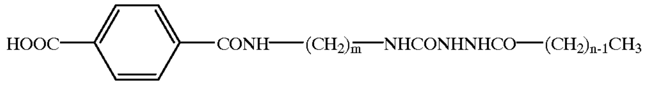
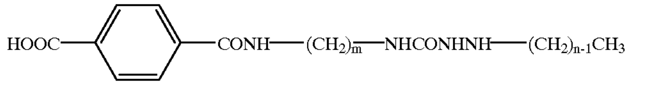
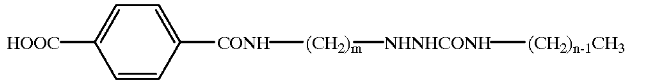

TABLE 5-continued
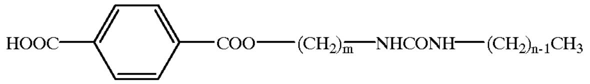
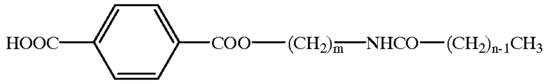
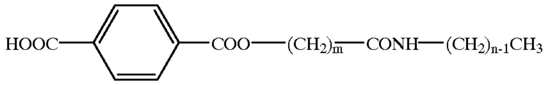
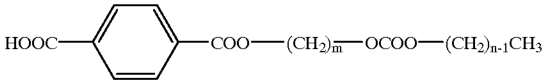
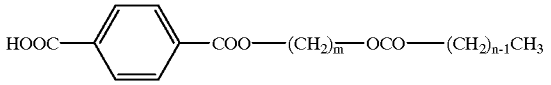
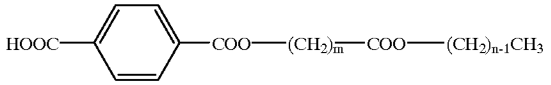
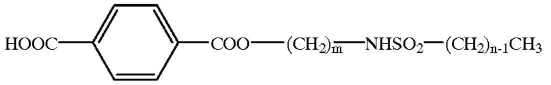
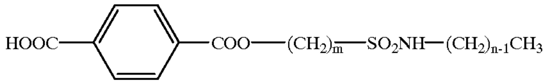
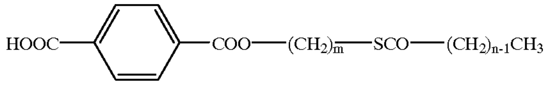
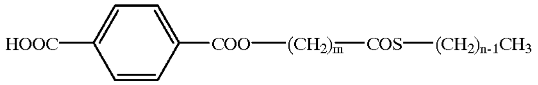
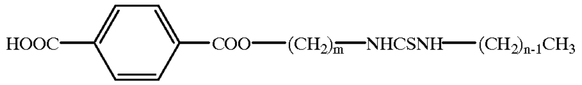
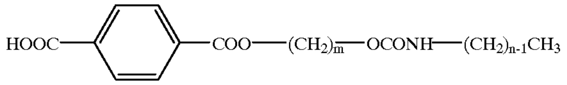
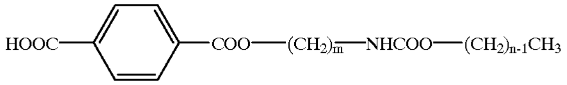
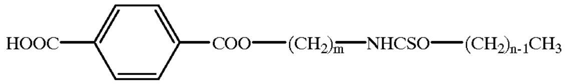

TABLE 5-continued
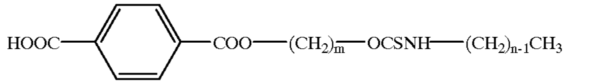
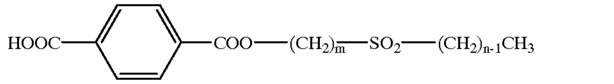
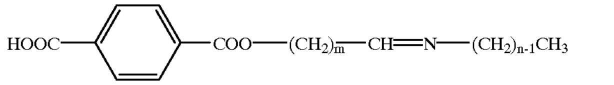
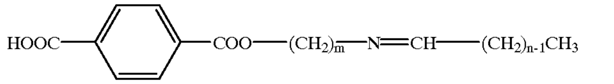
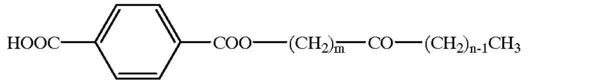
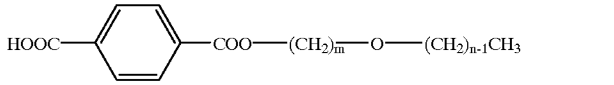
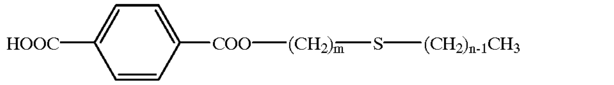
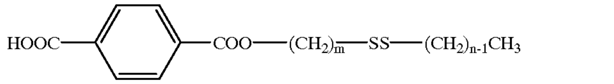
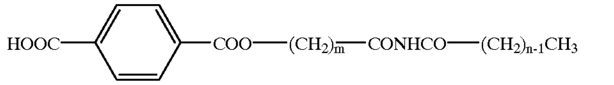
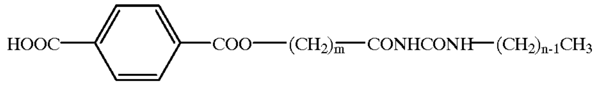
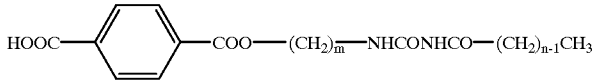
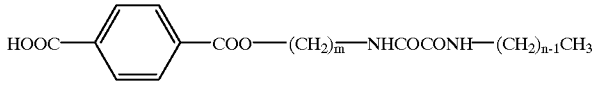
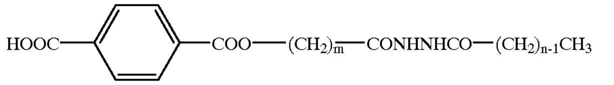
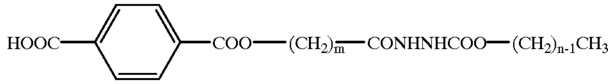

TABLE 5-continued
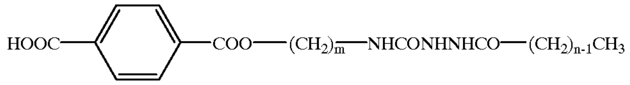
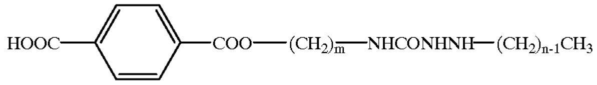
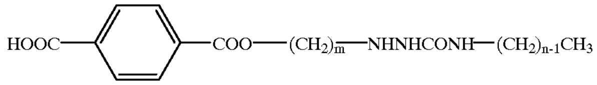
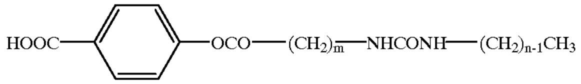
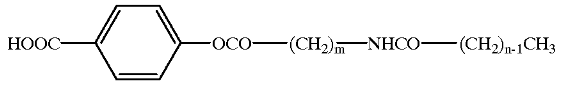
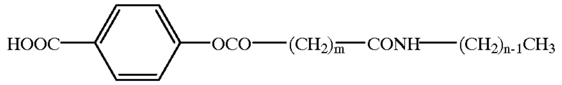
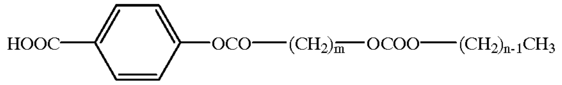
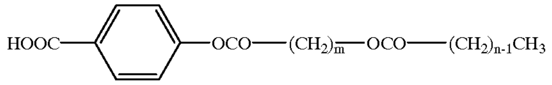
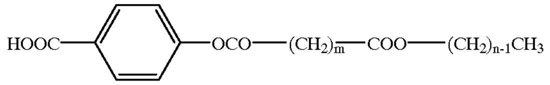
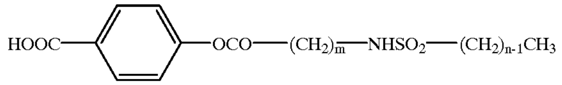
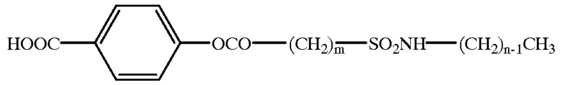
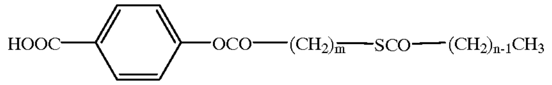
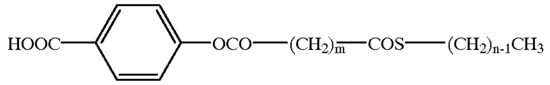
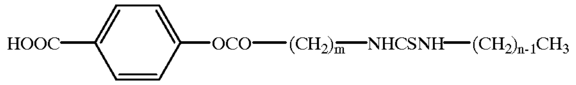

TABLE 5-continued
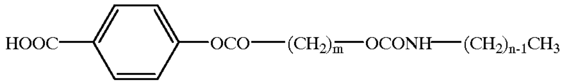
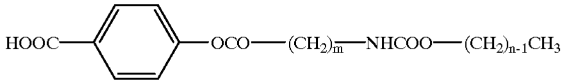
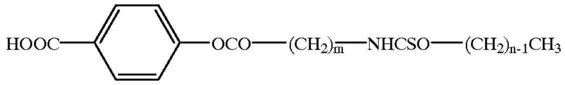
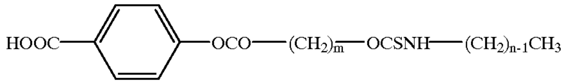
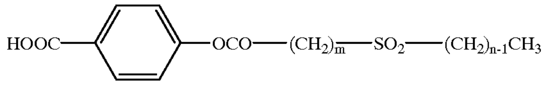
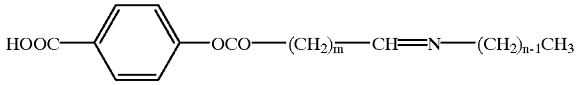
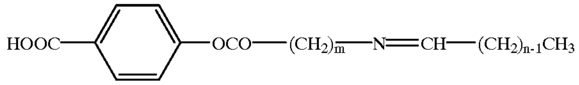
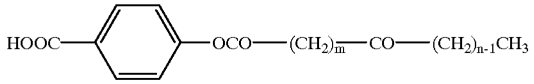
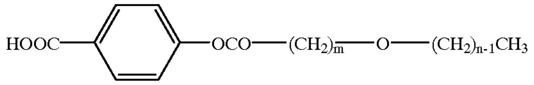
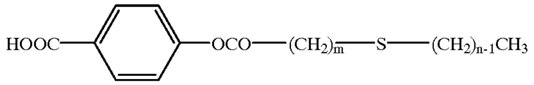
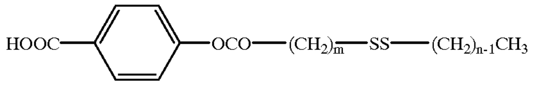
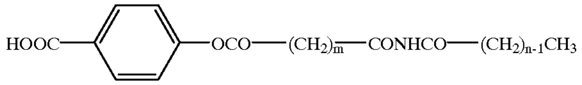
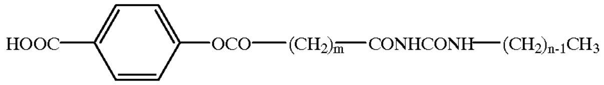
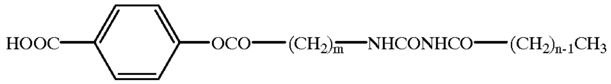

TABLE 5-continued
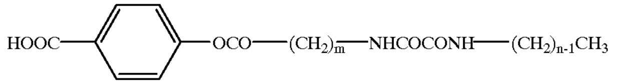
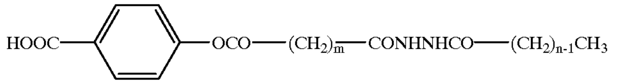
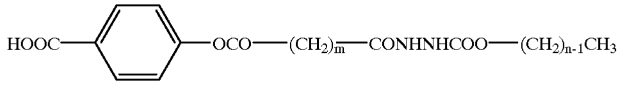
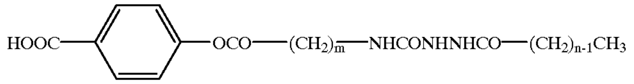
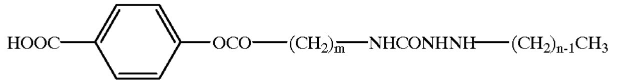
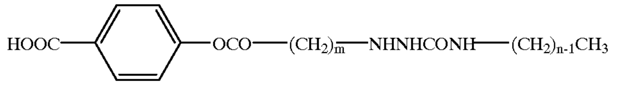
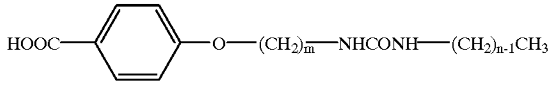
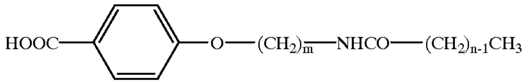
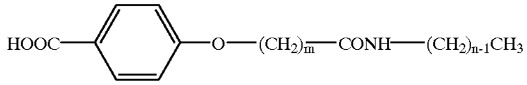
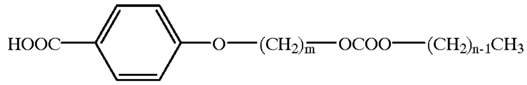
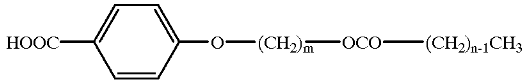
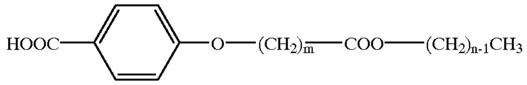
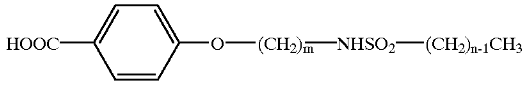
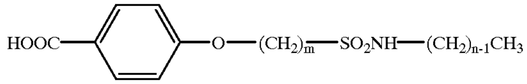

TABLE 5-continued
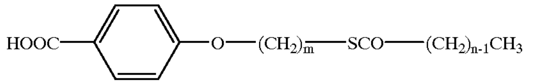
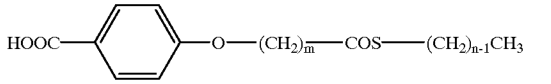
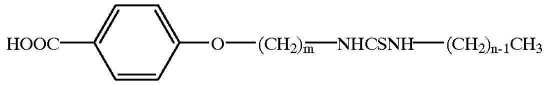
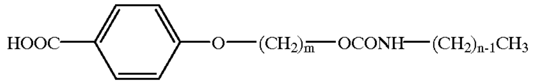
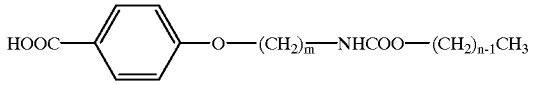
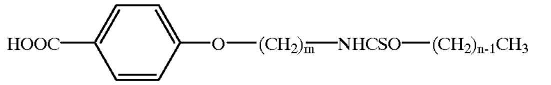
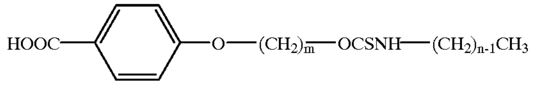
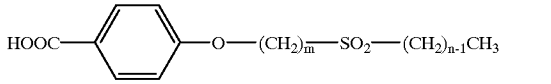
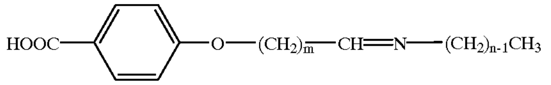
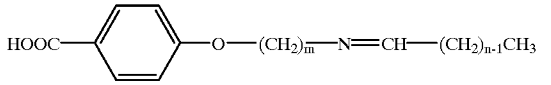
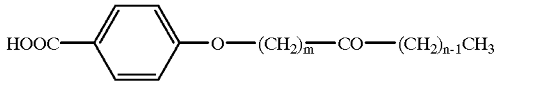
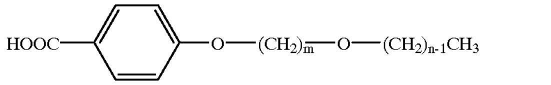
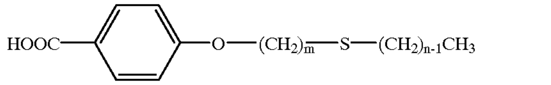
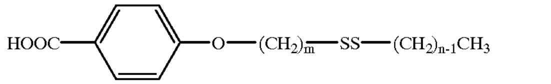

TABLE 5-continued
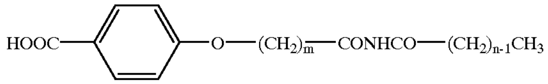
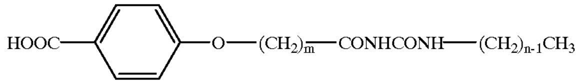
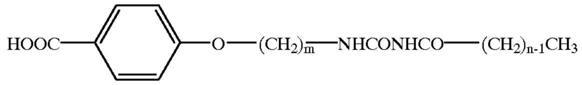
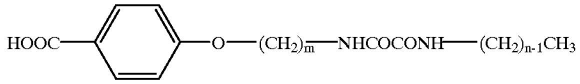
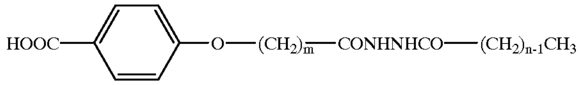
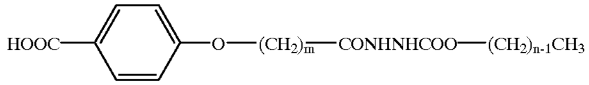
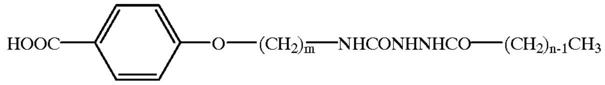
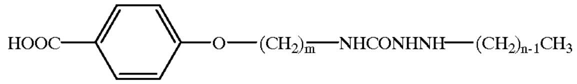
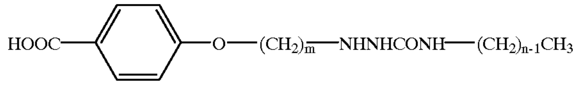
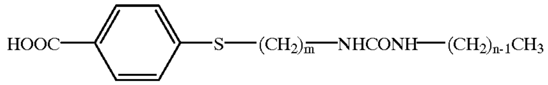
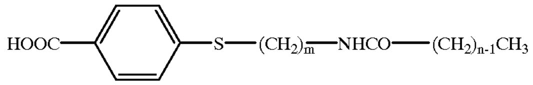
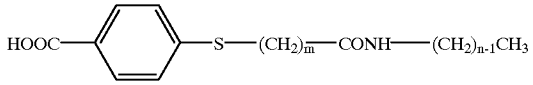
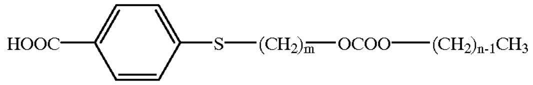
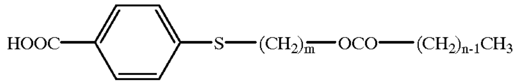

TABLE 5-continued
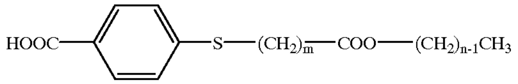
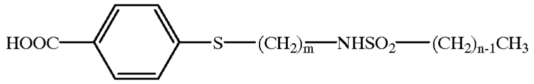
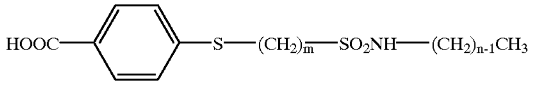
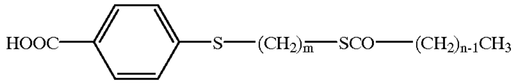
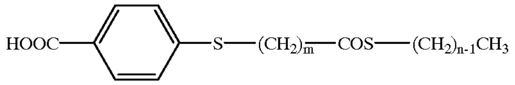
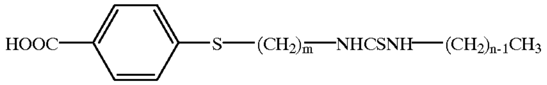
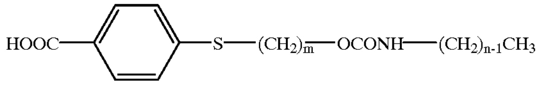
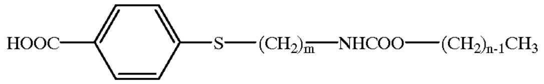
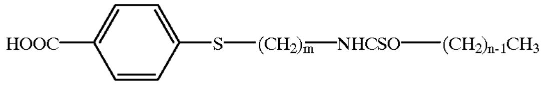
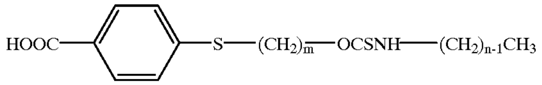
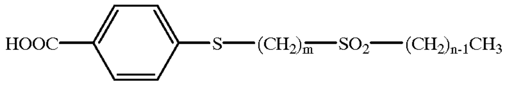
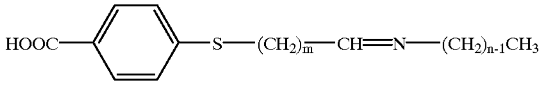
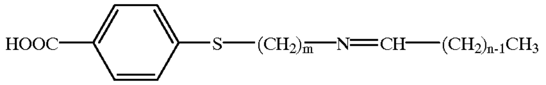
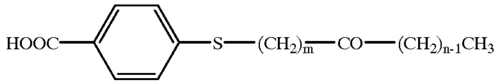

TABLE 5-continued

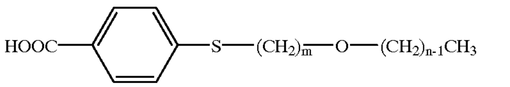

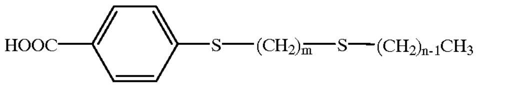

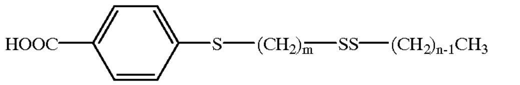

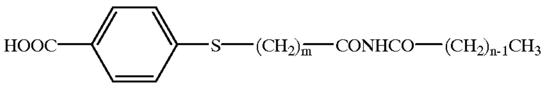

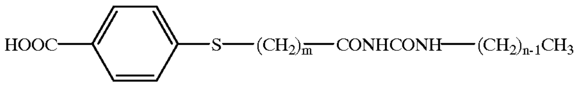

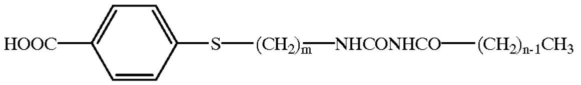

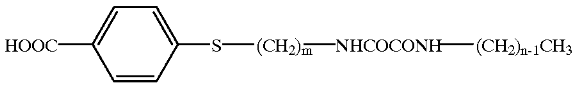

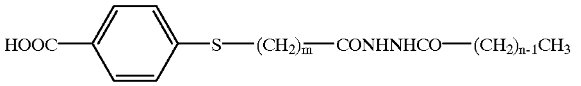

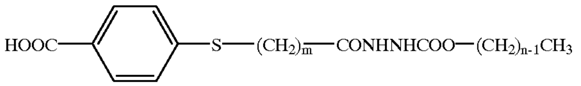

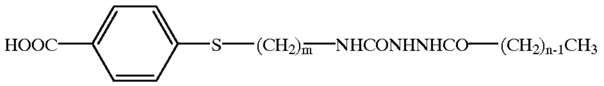

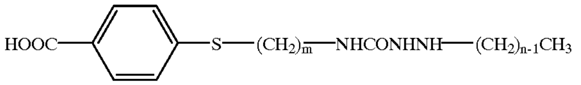

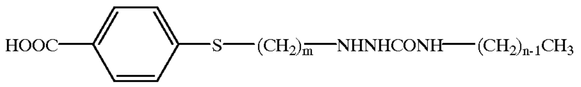

Specific examples of $R^0$, Z and W in the compounds of formulae (19) to (26), and (28) to (34) may respectively be the same as the corresponding moieties specifically shown in Table 5.

Taking as an example the compound of formula (III-27-a) in Table 5, specific compounds represented by formula (III-27-a) that can be used as color developers for use in the present invention are shown in Table 6:

TABLE 6

| |
|---|
| 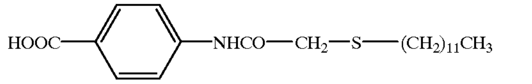 |
| 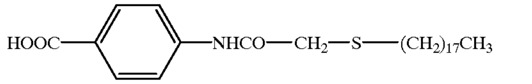 |
| 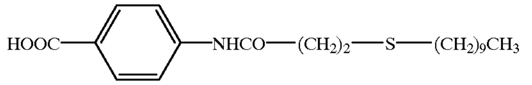 |
| 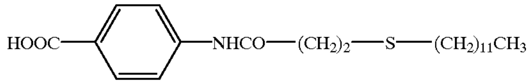 |
| 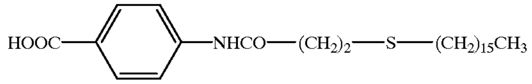 |
| 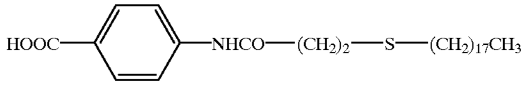 |
| 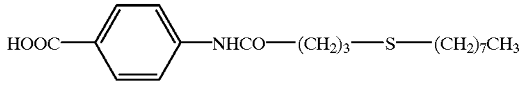 |
| 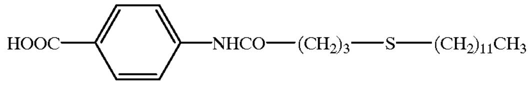 |
| 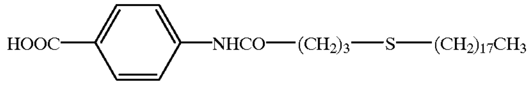 |
| 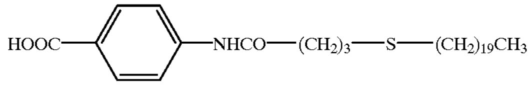 |
| 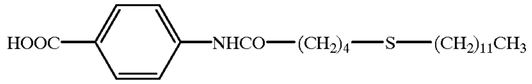 |
| 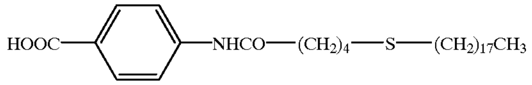 |
| 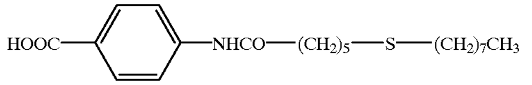 |
| 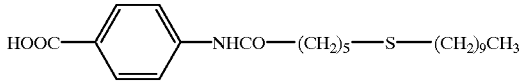 |

TABLE 6-continued

| |
|---|
| 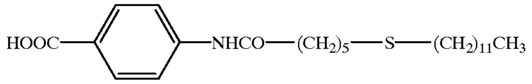 |
| 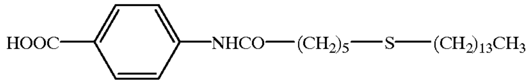 |
| 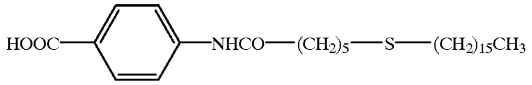 |
| 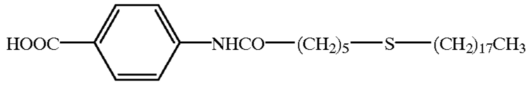 |
| 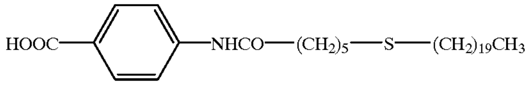 |
| 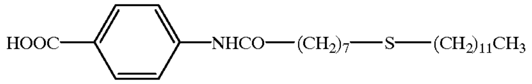 |
| 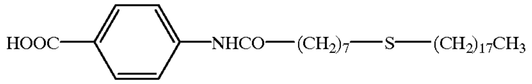 |
| 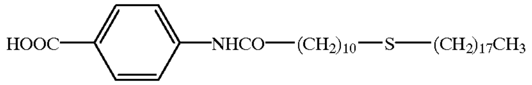 |
| 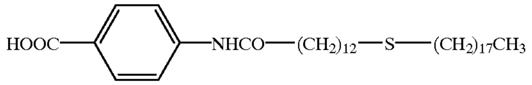 |

The reversible thermosensitive coloring composition of the present invention comprises the above-mentioned color developer and a coloring agent. The coloring agent for use in the present invention exhibits electron-donating characteristics and is a colorless or light-colored dye precursor such as a leuco dye, but is not limited to a particular coloring agent.

Conventional leuco dyes such as phthalide compounds, azaphthalide compounds, fluoran compounds, phenothiazine compounds, and Leuco-Auramine compounds can be employed as coloring agents in the present invention.

In particular, the following compounds of formulae (V) or (VI) are preferably employed as the coloring agents for use in the present invention:

(V)

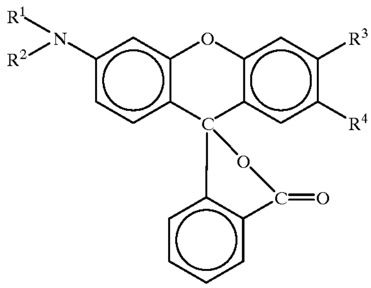

(VI)

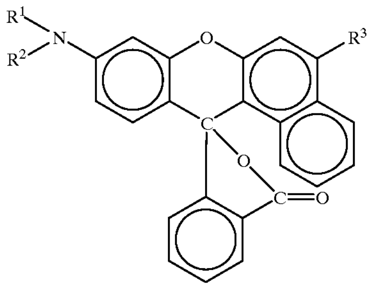

wherein $R^1$ is a hydrogen atom or an alkyl group having 1 to 4 carbon atoms; $R^2$ is an alkyl group having 1 to 6 carbon atoms, a cycloalkyl group, or a phenyl group which may have a substituent, for example, an alkyl group such as methyl group or ethyl group, an alkoxyl group such as methoxy group or ethoxy group, and/or a halogen atom; $R^3$ is a hydrogen atom, an alkyl group having 1 or 2 carbon atoms, an alkoxyl group having 1 or 2 carbon atoms, or a halogen atom; and $R^4$ is a hydrogen atom, methyl group, a halogen atom, or an amino group which may have a substituent such as an alkyl group, an unsubstituted or substituted aryl group, or an unsubstituted or substituted aralkyl group. Examples of substituents of the aryl group and aralkyl group are an alkyl group, a halogen atom or an alkoxyl group.

Specific examples of coloring agents for use in the present invention are as follows:

2-anilino-3-methyl-6-diethylaminofluoran,
2-anilino-3-methyl-6-di(n-butylamino)fluoran,
2-anilino-3-methyl-6-(N-n-propyl-N-methylamino)fluoran,
2-anilino-3-methyl-6-(N-isopropyl-N-methylamino)fluoran,
2-anilino-3-methyl-6-(N-isobutyl-N-methylamino)fluoran,
2-anilino-3-methyl-6-(N-n-amyl-N-methylamino)fluoran,
2-anilino-3-methyl-6-(N-sec-butyl-N-methylamino) fluoran,
2-anilino-3-methyl-6 (N-n-amyl-N-ethylamino)fluoran,
2-anilino-3-methyl-6-(N-isoamyl-N-ethylamino)fluoran,
2-anilino-3-methyl-6-(N-n-propyl-N-isopropylamino)fluoran,
2-anilino-3-methyl-6-(N-cyclohexyl-N-methylamino)fluoran,
2-anilino-3-methyl-6-(N-ethyl-p-toluidino)fluoran,
2-anilino-3-methyl-6-(N-methyl-p-toluidino)fluoran,
2-(m-trichloromethylanilino)-3-methyl-6-diethylaminofluoran,
2-(m-trifluoromethylanilino)-3-methyl-6-diethylaminofluoran,
2-(m-trichloromethylanilino)-3-methyl-6-(N-cyclohexyl-N-methylamino)fluoran,
2-(2,4-dimethylanilino)-3-methyl-6-diethylaminofluoran,
2-(N-ethyl-p-toluidino)-3-methyl-6-(N-ethylanilino)-fluoran, -continued 2-(N-ethyl-p-toluidino)-3-methyl-6-(N-propyl-p-toluidino)fluoran,
2-anilino-6-(N-n-hexyl-N-ethylamino)fluoran,
2-(o-chloroanilino)-6-diethylaminofluoran,
2-(o-chloroanilino)-6-dibutylaminofluoran,
2-(m-trifluoromethylanilino)-6-diethylaminofluoran,
2-(p-acetylanilino)-6-(N-n-amyl-N-n-butylamino)fluoran,
2-benzylamino-6-(N-ethyl-p-toluidino)fluoran,
2-benzylamino-6-(N-methyl-2,4-di-ethylanilino)fluoran,
2-benzylamino-6-(N-ethyl-2,4-dimethylanilino)fluoran,
2-benzylamino-6-(N-methyl-p-toluidino)fluoran,
2-benzylamino-6-(N-ethyl-p-toluidino)fluoran,
2-(di-p-methylbenzylamino)-6-(N-ethyl-p-toluidino)-fluoran,
2-(α-phenylethylamino)-6-(N-ethyl-p-toluidino)fluoran,
2-methylamino-6-(N-methylanilino)fluoran,
2-methylamino-6-(N-ethylanilino)fluoran,
2-methylamino-6-(N-propylanilino)fluoran,
2-ethylamino-6-(N-methyl-p-toluidino)fluoran,
2-methylamino-6-(N-methyl-2,4-dimethylanilino)fluoran,
2-ethylamino-6-(N-ethyl-2,4-dimethylanilino)fluoran,
2-dimethylamino-6-(N-methylanilino)fluoran,
2-dimethylamino-6-(N-ethylanilino)fluoran,
2-diethylamino-6-(N-methyl-p-toluidino)fluoran,
2-diethylamino-6-(N-ethyl-p-toluidino)fluoran,
2-dipropylamino-6-(N-methylanilino)fluoran,
2-dipropylamino-6-(N-ethylanilino)fluoran,
2-amino-6-(N-methylanilino)fluoran,
2-amino-6-(N-ethylanilino)fluoran,
2-amino-6-(N-propylanilino)fluoran,
2-amino-6-(N-methyl-p-toluidino)fluoran,
2-amino-6-(N-ethyl-p-toluidino)fluoran,
2-amino-6-(N-propyl-p-toluidino)fluoran,
2-amino-6-(N-methyl-p-ethylanilino)fluoran,
2-amino-6-(N-ethyl-p-ethylanilino)fluoran,
2-amino-6-(N-propyl-p-ethylanilino)fluoran,
2-amino-6-(N-methyl-2,4-dimethylanilino)fluoran,
2-amino-6-(N-ethyl-2,4-dimethylanilino)fluoran,
2-amino-6-(N-propyl-2,4-dimethylanilino)fluoran,
2-amino-6-(N-methyl-p-chloroanilino)fluoran,
2-amino-6-(N-ethyl-p-chloroanilino)fluoran,
2-amino-6-(N-propyl-p-chloroanilino)fluoran,
2,3-dimethyl-6-dimethylaminofluoran,
3-methyl-6-(N-ethyl-p-toluidino)fluoran,
2-chloro-6-diethylaminofluoran,
2-bromo-6-diethylaminofluoran,
2-chloro-6-dipropylaminofluoran,
3-chloro-6-cyclohexylaminofluoran,
3-bromo-6-cyclohexylaminofluoran,
2-chloro-6-(N-ethyl-N-isoamylamino)fluoran,
2-chloro-3-methyl-6-diethylaminofluoran,
2-anilino-3-chloro-6-diethylaminofluoran,
2-(o-chloroanilino)-3-chloro-6-cyclohexylaminofluoran,
2-(m-trifluoromethylanilino)-3-chloro-6-diethylamino-fluoran,
2-(2,3-dichloroanilino)-3-chloro-6-diethylaminofluoran,
1,2-benzo-6-diethylaminofluoran,
1,2-benzo-6-(N-ethyl-N-isoamylamino)fluoran,
1,2-benzo-6-dibutylaminofluoran,
1,2-benzo-6-(N-methyl-N-cyclohexylamino)fluoran, and
1,2-benzo-6-(N-ethyl-N-toluidino)fluoran.

The following coloring agents can also be preferably employed in the present invention:

2-anilino-3-methyl-6-(N-2-ethoxypropyl-N-ethylamino)-fluoran,
2-(p-chloroanilino)-6-(N-n-octylamino)fluoran,
2-(p-chloroanilino)-6-(N-n-palmitylamino)fluoran,
2-(p-chloroanilino)-6-(di-n-octylamino)fluoran,
2-benzoylamino-6-(N-ethyl-p-toluidino)fluoran,
2-(o-methoxybenzoylamino)-6-(N-methyl-p-toluidino)-fluoran,
2-dibenzylamino-4-methyl-6-diethylaminofluoran,
2-dibenzylamino-4-methyoxy-6-(N-methyl-p-toluidino)-fluoran,
2-benzylamino-4-methyl-6-(N-ethyl-p-toluidino)fluoran,
2-(α-phenylethylamino)-4-methyl-6-diethylaminofluoran,
2-(p-toluidino)-3-(t-butyl)-6-(N-methyl-p-toluidino)-fluoran, -continued

| |
|---|
| 2-(o-methoxycarbonylanilino)-6-diethylaminofluoran, |
| 2-acetylamino-6-(N-methyl-p-toluidino)fluoran, |
| 3-diethylamino-6-(m-trifluoromethylanilino)fluoran, |
| 4-methoxy-6-(N-ethyl-p-toluidino)fluoran, |
| 2-ethoxyethylamino-3-chloro-6-dibutylaminofluoran, |
| 2-dibenzylamino-4-chloro-6-(N-ethyl-p-toluidino)fluoran, |
| 2-(α-phenylethylamino)-4-chloro-6-diethylaminofluoran, |
| 2-(N-benzyl-p-trifluoromethylanilino)-4-chloro-6-diethylaminofluoran, |
| 2-anilino-3-methyl-6-pyrrolidinofluoran, |
| 2-anilino-3-chloro-6-pyrrolidinofluoran, |
| 2-anilino-3-methyl-6-(N-ethyl-N-tetrahydrofurfuryl-amino)fluoran, |
| 2-mesidino-4',5'-benzo-6-diethylaminofluoran, |
| 2-(m-trifluoromethylanilino)-3-methyl-6-pyrrolidino-fluoran, |
| 2-(α-naphthylamino)-3,4-benzo-4'-bromo-6-(N-benzyl-N-cyclohexylamino)fluoran, |
| 2-piperidino-6-diethylaminofluoran, |
| 2-(N-n-propyl-p-trichloromethylanilino)-6-morpholino-fluoran, |
| 2-(di-N-p-chlorophenyl-methylamino)-6-pyrrolidinofluoran, |
| 2-(N-n-propyl-m-trifluoromethylanilino)-6-morpholino-fluoran, |
| 1,2-benzo-6-(N-ethyl-N-n-octylamino)fluoran, |
| 1,2-benzo-6-diallylaminofluoran, |
| 1,2-benzo-6-(N-ethoxyethyl-N-ethylamino)fluoran, |
| benzo leuco methylene blue, |
| 2-[3,6-bis(diethylamino)]-6-(o-chloroanilino)xanthyl-benzoic acid lactam, |
| 2-[3,6-bis(diethylamino)]-9-(o-chloroanilino)xanthyl-benzoic acid lactam, |
| 3,3-bis(p-dimethylaminophenyl)-phthalide, |
| 3,3-bis(p-dimethylaminophenyl)-6-dimethylaminophthalide (or Crystal Violet Lactone), |
| 3,3-bis(p-dimethylaminophenyl)-6-diethylaminophthalide, |
| 3,3-bis(p-dimethylaminophenyl)-6-chlorophthalide, |
| 3,3-bis(p-dibutylaminophenyl)phthalide, |
| 3-(2-methoxy-4-dimethylaminophenyl)-3-(2-hydroxy-4,5-dichlorophenyl)phthalide, |
| 3-(2-hydroxy-4-dimethylaminophenyl)-3-(2-methoxy-5-chlorophenyl)phthalide, |
| 3-(2-hydroxy-4-dimethoxyaminophenyl)-3-(2-methoxy-5-chlorophenyl)phthalide, |
| 3-(2-hydroxy-4-dimethylaminophenyl)-3-(2-methoxy-5-nitrophenyl)phthalide, |
| 3-(2-hydroxy-4-diethylaminophenyl)-3-(2-methoxy-5-methylphenyl)phthalide, |
| 3-(2-methoxy-4-dimethylaminophenyl)-3-(2-hydroxy-4-chloro-5-methoxyphenyl)phthalide, |
| 3,6-bis(dimethylamino)fluorenespiro-(9,3')-6'-dimethylaminophthalide, |
| 3-(1-ethyl-2-methylindole-3-yl)-3-(2-ethoxy-4-diethylaminophenyl)-4-azaphthalide, |
| 3-(1-octyl-2-methylindole-3-yl)-3-(2-ethoxy-4-diethylaminophenyl)-4-azaphthalide, |
| 3-(1-ethyl-2-methylindole-3-yl)-3-(2-ethoxy-4-diethylaminophenyl)-7-azaphthalide, |
| 3,3-bis(2-ethoxy-4-diethylaminophenyl)-4-azaphthalide, |
| 3,3-bis(2-ethoxy-4-diethylaminophenyl)-7-azaphthalide, |
| 6'-chloro-8'-methoxy-benzoindolino-spiropyran, and |
| 6'-bromo-2'-methoxy-benzoindolino-spiropyran. |

The reversible thermosensitive coloring composition of the present invention can reversibly assume a color-developed state and a decolorized state by controlling the temperature of the coloring composition in the heating step and/or controlling the cooling rate in the cooling step after the heating step. The color development and decolorization phenomenon of the reversible thermosensitive coloring composition according to the present invention will now be explained with reference to a graph in FIG. 1.

In FIG. 1, the abscissa of the graph indicates the temperature of a reversible thermosensitive coloring composition, and the ordinate indicates the color-developed density of the reversible thermosensitive coloring composition. As is apparent from the graph, the color-developed density of the reversible thermosensitive coloring composition according to the present invention changes depending on the temperature thereof.

In FIG. 1, reference symbol A indicates the decolorized state of the reversible thermosensitive coloring composition at room temperature. When the temperature of the coloring composition in the decolorized state A is raised up to a temperature $T_1$, the color development takes place because the coloring composition begins to be fused at the temperature $T_1$. Reference symbol B indicates the color-developed state of the composition which is in a fused state.

Even when the temperature of the fused composition in the color-developed state B is rapidly decreased to room temperature, the color-developed state is maintained at a color-developed state C through the path indicated by the solid line between B and C. Reference symbol C indicates a color-developed state of the composition in a solid form at room temperature. Whether or not the color-developed state of the coloring composition can be maintained at room temperature depends upon the temperature-decreasing rate for the color composition during the cooling step. If a fused coloring composition in the color-developed state B is gradually cooled, decolorization takes place as the temperature is decreased through the path indicated by the dotted line between B and E. As a result, the coloring composition returns to the initial decolorized state A, or assumes a color-developed density lower than that of the composition in the color-developed state C.

When the composition in the color-developed state C, which is obtained from the color-developed state B by rapid cooling, is heated, decolorization takes place at a temperature $T_2$, that is lower than the color development temperature $T_1$, and the color-developed density of the composition is decreased through the path indicated by the broken line between D and E.

When the temperature of the composition is decreased thereafter, the composition is returned to the initial decolorized state A. The color development temperature and the decolorization temperature vary depending on the kinds of color developer and coloring agent employed for the reversible thermosensitive coloring composition, so that the color developer and the coloring agent may be selected according to the application of the reversible thermosensitive coloring composition. Furthermore, the color-developed density of the composition in the color-developed state B is not always the same as that of the composition in the color-developed state C.

In the color-developed state C of the reversible thermosensitive coloring composition, which is obtained by rapidly cooling the fused composition in the color-developed state B, the color developer and the coloring agent are mixed to such a degree that the molecules of the color developer and the coloring agent are in contact with each other to induce a coloring reaction. In such color-developed state C, the color developer and the coloring agent form an aggregation structure on a molecular level to maintain the color development phenomenon. It is considered that the color-developed state can be stably maintained at room temperature due to the formation of the above-mentioned aggregation structure.

On the other hand, in the decolorized state, the molecules of the color developer separate from the molecules of the coloring agent, so that at least one of the color developer or the coloring agent independently forms a domain or crystallizes. By such separation of the molecules of the coloring agent from the molecules of the color developer, which may be referred to as "phase separation", the decolorized state is stabilized.

According to the present invention, in many cases, a completely decolorized state can be obtained by such phase separation of the color developer from the coloring agent, and the crystallization of the color developer.

As shown in FIG. 1, the decolorization takes place when the fused composition in the color-developed state B is gradually cooled, or when the solid composition in the color-developed state C is heated to the temperature $T_2$. In both cases, the aggregated structure of the molecules of the color developer and the coloring agent is broken, and at the same time, the phase separation is caused and the color developer crystallizes out in the composition at the decolorization temperature.

In a reversible thermosensitive recording medium comprising the above-mentioned reversible thermosensitive coloring composition of the present invention, a colored recording image can be formed therein by heating the recording medium to fuse the coloring composition, for example, using a thermal head, and then rapidly cooling the recording medium.

The colored recording material can be decolorized or erased by heating the recording medium and then gradually cooling the heated recording medium; or by heating the recording medium in the color developed state to a temperature $T_2$ which is lower than the color development temperature $T_1$.

The above-mentioned two methods for erasing the colored recording image are the same in the sense that the recording medium is temporarily held at a temperature where the above-mentioned phase separation is caused in the molecules of the color developer and those of the coloring agent or at least one of the color developer or the coloring agent crystallizes.

In the color development step, the recording medium is heated to the color development temperature, and then rapidly cooled. Such rapid cooling is necessary not to maintain the reversible thermosensitive recording medium at the phase separation or crystallization temperature.

In the cooling rate for the reversible thermosensitive recording medium of the present invention, "rapid" and "gradual" are not absolute, but relative, so that the cooling rate should be appropriately adjusted in accordance with the combination of the coloring agent and the color developer employed.

The molar ratio of the coloring agent to the color developer for use in the composition varies depending on the combination of the respective compounds employed. It is preferable that the molar ratio of the color developer to the coloring agent be in the range of (0.1:1) to (20:1), more preferably in the range of (0.2:1) to (10:1) for obtaining an appropriate color-developed density for use in practice. In other words, when the molar ratio of the color developer to the coloring agent is within the above-mentioned range, the color-developed density of a colored recording image is sufficient while in use.

The reversible thermosensitive recording medium according to the present invention comprises a support, and a thermosensitive recording layer formed thereon comprising the above-mentioned reversible thermosensitive coloring composition as a main component.

Any material can be used for the support of the reversible thermosensitive recording medium as long as it can support the recording layer thereon. For example, a sheet of paper, a resin film, a synthetic paper, a metallic foil, a glass plate, and a composite member of any of the above-mentioned materials can be employed.

The thermosensitive recording layer of the reversible thermosensitive recording medium can be made in any form as long as the above-mentioned reversible thermosensitive coloring composition can be contained therein.

In general, the recording layer comprises a binder resin in which the coloring agent and the color developer are finely and uniformly dispersed. Finely-divided particles of the coloring agent and those of the color developer may be independently present in the recording layer, but it is preferable that a composite material of the coloring agent and the color developer be dispersed in the form of finely-divided particles in the recording layer. To obtain such finely-divided particles of the composite material, the color developer and the coloring agent may be mixed and fused or dissolved in a solvent prior to the coating thereof for the formation of the recording layer.

To provide the thermosensitive recording layer on the support, a coating liquid is prepared by separately dispersing or dissolving the coloring agent and the color developer in the respective solvents, and mixing the two liquids, or dispersing or dissolving a mixture of the coloring agent and the color developer in a proper solvent. The coating liquid thus prepared may be coated on the support and dried. Alternatively, the color developer and the coloring agent may be microcapsuled for use in the present invention.

For the fabrication of the reversible thermosensitive recording medium of the present invention, when necessary, there may be employed a variety of additives, for instance, a dispersant, a surfactant, an electro-conductivity imparting agent, a filler, a lubricant, an antioxidant, a photostabilizer, an ultraviolet light absorber, a coloring stabilizer, and a decolorization accelerating agent to improve the coating characteristics and to control the color development and decolorization performance.

Examples of binder resins for use in the recording layer are polyvinyl chloride, polyvinyl acetate, vinyl chloride—vinyl acetate copolymer, ethyl cellulose, polystyrene, styrene copolymers, phenoxy resin, polyester, aromatic polyester, polyurethane, polycarbonate, polyacrylic acid ester, polymethacrylic acid ester, acrylic acid copolymers, maleic acid copolymers, polyvinyl alcohol, modified polyvinyl alcohol, hydroxyethyl cellulose, carboxymethyl cellulose and starches. These binder resins serve to maintain the composition of the coloring agent and the color developer in a uniformly dispersed state in the recording layer without partial aggregation even when color development and the decolorization are repeated by the application of heat to the recording medium. From this point of view, highly heat resistant binder resins are preferably employed. Binder resins for use in the recording layer may be crosslinked by the application of heat, ultraviolet light or electron radiation thereto.

The reversible thermosensitive recording medium of the present invention may further comprise a protective layer, an adhesive layer, an intermediate layer, an undercoat layer and/or a backcoat layer.

When color development and decolorization are carried out using a thermal head, it is preferable that a protective layer be provided on the recording layer in order to prevent the recording layer from being deformed or scratched by the thermal head during the application of heat and pressure thereto.

Examples of materials for use in the protective layer are polyvinyl alcohol, styrene—maleic anhydride copolymer, carboxyl-modified polyethylene, melamine-formaldehyde resin, and urea-formaldehyde resin. Furthermore, an ultraviolet-curing resin and an electron radiation curing resin can also be employed.

The protective layer may further comprise an additive such as an ultraviolet light absorber.

Furthermore, it is also preferable to provide an intermediate layer between the recording layer and the protective layer for improving the adhesion of the protective layer to the recording layer, for preventing changes in the characteristics of the recording layer caused by the application of a coating liquid for the provision of the protective layer to the recording layer, and for preventing additives for use in the protective layer from entering the recording layer. Resins with low oxygen permeability are preferably employed for the protective layer and the intermediate layer for minimizing the oxidation of the coloring agent and the color developer in the recording layer.

A heat-insulating undercoat layer may also be provided between the support and the recording layer to use effectively thermal energy applied to the recording medium. Such heat-insulating undercoat layer can be formed by coating on the support a mixture of a binder resin and organic or inorganic minute void particles dispersed therein. Also there may be provided between the recording layer and the support an undercoat layer for improving the adhesion between the recording layer and the support and for preventing the constituent components for the recording layer from permeating through the support.

The same binder resins as employed in the recording layer can also be used for the formation of the above-mentioned intermediate layer and the undercoat layer.

Each of the protective layer, intermediate layer, recording layer and undercoat layer may further comprise a filler such as calcium carbonate, magnesium carbonate, titanium oxide, silicon oxide, aluminum hydroxide, kaolin, or talc. In addition to such filler, a lubricant, a surfactant and a dispersant may be contained.

To obtain a colored recording image in the reversible thermosensitive recording medium of the present invention, the recording medium may be heated to a temperature higher than the color development temperature, and then rapidly cooled. To perform this heating and cooling operations, the recording layer of the recording medium may be heated imagewise for a short period of time using a thermal head or applying a laser beam thereto. When this is done, only a particular portion or area of the recording layer is selectively heated, and heat diffuses immediately after the application of heat, so that the recording medium is rapidly cooled and a color-developed state can be stably maintained.

To erase the colored recording image formed in the reversible thermosensitive recording medium, the recording medium may be heated for a relatively long period of time using appropriate heating means, followed by gradual cooling. When the recording medium is heated for a relatively long period of time, the temperature of a large area of the recording medium is necessarily increased, so that the temperature decreases at a relatively slow rate in the cooling step and the decolorization takes place in the gradual cooling step.

For such erasing, a heat roller, a heat stamp or hot air can be used as heating means, or the recording medium may be heated for a long period of time using the thermal head.

Alternatively, the colored recording image can be erased from the recording medium by temporarily heating the recording medium to a temperature lower than the color development temperature. In this case, a thermal head is preferably employed as heating means. In comparison with the image recording step, when the colored recording image is erased, thermal energy to be applied to the recording medium may be decreased, appropriately controlling the voltage and pulse width applied to the thermal head. In this method, recording and erasing can be carried out using an identical thermal head. For this purpose, a heat roller and a heat stamp can also be employed.

Other features of this invention will become apparent in the course of the following description of exemplary embodiments which are given for illustration of the invention and are not intended to be limiting thereof.

EXAMPLE 1

2-anilino-3-methyl-6-dibutylamino-fluoran serving as a coloring agent and aromatic carboxylic acid compound No. 1 shown in Table 7 serving as a color developer were mixed in such a molar ratio that the coloring agent to the color developer was 1:2. This mixture was then ground in a mortar.

A glass plate with a thickness of 1.2 mm was heated to 220° C. on a hot plate. A small amount of the above obtained mixture of the color developer and the coloring agent was placed on the heated glass plate to fuse the mixture. The mixture assumed a black color as soon as it was fused.

A cover glass was overlaid on the fused mixture to spread the fused mixture so as to form a thin layer with a uniform thickness. Immediately after that, the fused mixture held between the glass plate and the cover glass was immersed in its entirety into iced water to rapidly cool the fused mixture and cooled, and was then taken out of the iced water. Wiping water off the cover glass and the glass plate, a reversible thermosensitive coloring composition of the present invention was obtained in the form of a thin film, assuming a black color.

When the above obtained reversible thermosensitive coloring composition in the black color-developed state was then placed on a hot plate heated to 140° C., the black color immediately disappeared, and the reversible thermosensitive coloring composition was decolorized. Thus, the decolorization temperature of this reversible thermosensitive coloring composition was considered to be 140° C.

When the reversible thermosensitive coloring composition in the decolorized state was again heated to 220° C., the composition assumed a black color again. Thus, it was confirmed that this reversible thermosensitive coloring composition had reversible properties with respect to the color development and decolorization.

EXAMPLES 2 to 9

The procedure for preparation of the reversible thermosensitive coloring composition in Example 1 was repeated except that the aromatic carboxylic acid compound No. 1 employed as the color developer in the coloring composition in Example 1 was replaced by the respective aromatic carboxylic acid compounds Nos. 2 to 9 shown in Table 7, whereby reversible thermosensitive coloring compositions according to the present invention were prepared.

Each of the thus prepared reversible thermosensitive coloring compositions was subjected to the same color development and decolorization test as in Example 1. As a result, it was confirmed that the above-mentioned reversible thermosensitive coloring compositions had reversible properties with respect to the color development and decolorization.

TABLE 7

| Aromatic Carboxylic Acid Compound No. | Chemical Structure |
|---|---|
| No. 1 | 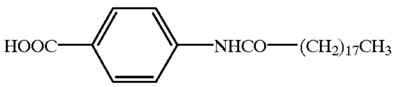 |
| No. 2 | 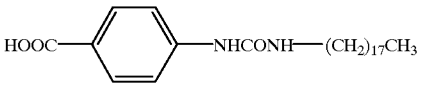 |
| No. 3 | 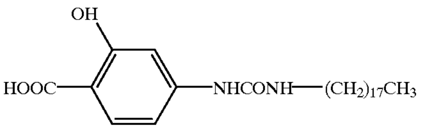 |
| No. 4 | 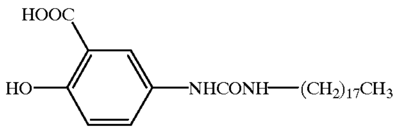 |
| No. 5 | 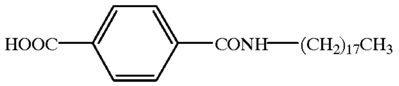 |
| No. 6 | 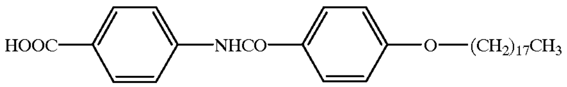 |
| No. 7 | 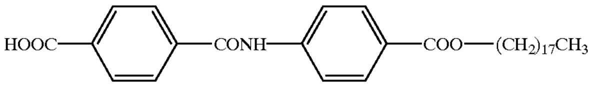 |
| No. 8 | 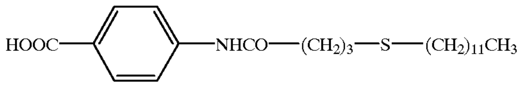 |
| No. 9 | 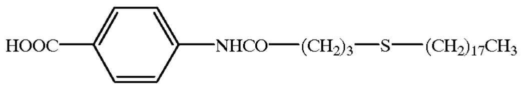 |

EXAMPLE 10

A mixture of the following components was dispersed and ground in a ball mill until the particle sizes thereof were reduced to 1 to 4 μm, whereby a coating liquid for the formation of a thermosensitive recording layer was prepared:

| | Parts by weight |
|---|---|
| 2-anilino-3-methyl-6-dibutylaminofluoran | 2 |
| Aromatic carboxylic acid compound No. 2 in Table 7 | 8 |
| Vinyl chloride-vinyl acetate copolymer (Trademark "VYHH" made by Union Carbide Japan K.K.) | 20 |

-continued

| | Parts by weight |
|---|---|
| Methyl ethyl ketone | 45 |
| Toluene | 45 |

The thus prepared coating liquid was coated on a polyester film with a thickness of 100 μm, using a wire bar, and dried, so that a thermosensitive recording layer with a thickness of about 6.0 μm was provided on the polyester film. Thus, a reversible thermosensitive recording medium No. 1 according to the present invention was fabricated.

EXAMPLE 11

The procedure for fabrication of the reversible thermosensitive recording medium No. 1 in Example 10 was repeated except that the aromatic carboxylic acid compound No. 2 employed as the color developer in the coating liquid for the formation of the thermosensitive recording layer in Example 10 was replaced by aromatic carboxylic acid compound No. 3 shown in Table 7.

Thus, a reversible thermosensitive recording medium No. 2 according to the present invention was fabricated.

EXAMPLE 12

The procedure for fabrication of the reversible thermosensitive recording medium No. 1 in Example 10 was repeated except that the aromatic carboxylic acid compound No. 2 employed as the color developer in the coating liquid for the formation of the thermosensitive recording layer in Example 10 was replaced by aromatic carboxylic acid compound No. 4 shown in Table 7.

Thus, a reversible thermosensitive recording medium No. 3 according to the present invention was fabricated.

EXAMPLE 13

The procedure for fabrication of the reversible thermosensitive recording medium No. 2 in Example 11 was repeated except that 2-anilino-3-methyl-6-dibutylaminofluoran employed as the coloring agent in the coating liquid for the formation of the thermosensitive recording layer in Example 11 was replaced by 2-(o-chloroanilino)-6-dibutylaminofluoran.

Thus, a reversible thermosensitive recording medium No. 4 according to the present invention was fabricated.

EXAMPLE 14

The procedure for fabrication of the reversible thermosensitive recording medium No. 3 in Example 12 was repeated except that 2-anilino-3-methyl-6-dibutylaminofluoran employed as the coloring agent in the coating liquid for the formation of the thermosensitive recording layer in Example 12 was replaced by 2-(o-chloroanilino)-6-dibutylaminofluoran.

Thus, a reversible thermosensitive recording medium No. 5 according to the present invention was fabricated.

EXAMPLE 15

The procedure for fabrication of the reversible thermosensitive recording medium No. 1 in Example 10 was repeated except that the aromatic carboxylic acid compound No. 2 employed as the color developer in the coating liquid for the formation of the thermosensitive recording layer in Example 10 was replaced by the aromatic carboxylic acid compound No. 5 shown in Table 7.

Thus, a reversible thermosensitive recording medium No. 6 according to the present invention was fabricated.

EXAMPLE 16

The procedure for fabrication of the reversible thermosensitive recording medium No. 1 in Example 10 was repeated except that the aromatic carboxylic acid compound No. 2 employed as the color developer in the coating liquid for the formation of the thermosensitive recording layer in Example 10 was replaced by the aromatic carboxylic acid compound No. 8 shown in Table 7.

Thus, a reversible thermosensitive recording medium No. 7 according to the present invention was fabricated.

EXAMPLE 17

The procedure for fabrication of the reversible thermosensitive recording medium No. 1 in Example 10 was repeated except that the aromatic carboxylic acid compound No. 2 employed as the color developer in the coating liquid for the formation of the thermosensitive recording layer in Example 10 was replaced by the aromatic carboxylic acid compound No. 9 shown in Table 7.

Thus, a reversible thermosensitive recording medium No. 8 according to the present invention was fabricated.

COMPARATIVE EXAMPLE 1

The procedure for fabrication of the reversible thermosensitive recording medium in Example 10 was repeated except that the aromatic carboxylic acid compound No. 2 employed as the color developer in the coating liquid for the formation of the thermosensitive recording layer in Example 10 was replaced by eicosyl phosphonic acid, and that the 2-anilino-3-methyl-6-dibutylaminofluoran employed as the coloring agent in the coating liquid for the formation of the thermosensitive recording layer in Example 10 was replaced by 2-anilino-3-methyl-6-(N-ethyl-N-p-tolylamino)fluoran.

Thus, a comparative reversible thermosensitive recording medium No. 1 was fabricated.

Each of the reversible thermosensitive recording media No. 1 to No. 8 according to the present invention fabricated in Examples 10 to 17 and the comparative reversible thermosensitive recording medium No. 1 fabricated in Comparative Example 1 was subjected to a color development and decolorization test as follows:

A colored image was formed in each reversible thermosensitive recording medium with the application of thermal energy thereto using a thermal head of 8 dots/mm under the conditions that the applied voltage was 13.3 V and the applied pulse width was 1.2 mm/sec.

The optical density of the colored image thus formed in each recording medium was measured by a Macbeth densitometer RD-914. The results are shown in Table 8.

Then, the colored image formed in each recording medium was erased therefrom, heating the recording medium to the decolorization temperature as shown in Table 8 for one second using a heat gradient tester. The decolorized density of each recording medium was measured in the same manner as mentioned above using the Macbeth densitometer RD-914. The results are also shown in Table 8.

Such color development and decolorization test was repeated 10 times, and the color-developed density of the colored image and the decolorized density were measured in the 10th color development and decolorization test.

The results are shown in Table 8.

TABLE 8

| | Decolorization Temperature (° C.) | Initial Background Density | 1st Color Development and Decolorization Test | | 10th Color Development and Decolorization Test | |
|---|---|---|---|---|---|---|
| | | | Color-developed Density | Decolorized Density | Color-developed Density | Decolorized Density |
| Ex. 10 | 140 | 0.11 | 0.87 | 0.11 | 0.84 | 0.11 |
| Ex. 11 | 140 | 0.09 | 1.86 | 0.09 | 1.76 | 0.10 |
| Ex. 12 | 140 | 0.10 | 1.80 | 0.11 | 1.68 | 0.10 |
| Ex. 13 | 140 | 0.08 | 1.47 | 0.07 | 1.45 | 0.08 |
| Ex. 14 | 140 | 0.08 | 1.44 | 0.08 | 1.40 | 0.10 |
| Ex. 15 | 140 | 0.10 | 0.69 | 0.11 | 0.67 | 0.10 |
| Ex. 16 | 140 | 0.10 | 0.85 | 0.11 | 0.82 | 0.11 |

TABLE 8-continued

| | Decolor-ization Tempera-ture (° C.) | Initial Back-ground Density | 1st Color Development and Decolorization Test | | 10th Color Development and Decolorization Test | |
|---|---|---|---|---|---|---|
| | | | Color-devel-oped Density | Decolor-ized Density | Color-devel-oped Density | Decolor-ized Density |
| Ex. 17 | 120 | 0.10 | 0.68 | 0.10 | 0.67 | 0.11 |
| Comp. Ex. 1 | 80 | 0.15 | 1.10 | 0.45 | 1.08 | 0.48 |

The results shown in Table 8 indicate that the colored image formed in the reversible thermosensitive recording medium of the present invention was completely erased therefrom to such a degree that the decolorized density became substantially the same as the initial background density by heating the recording medium only for one second. In addition, the image formation and erasure was repeated stably. The reversible thermo-sensitive recording medium of the present invention can also cope with high speed decolorization.

In contrast to this, when the comparative reversible thermosensitive recording medium was heated for one second to erase colored images formed therein, the decolorized density did not reach the initial background density. Furthermore, the comparative recording medium had to be heated for one minute to decrease the decolorized density to 0.16, which is nearly the same as the initial background density.

As explained above, the reversible thermosensitive coloring composition of the present invention is capable of reversibly assuming a color-developed state and a decolorized state in a stable condition many times. Therefore, when the reversible thermosensitive recording medium is fabricated using the above-mentioned reversible thermosensitive coloring composition, a colored image can be firmed therein with high image contrast, and the colored image can be erased very easily. In addition, the colored image formed in the recording medium is stable under the normal operating conditions, and the durability of the recording medium is excellent even though the color development and decolorization operations are repeated many times. The reversible thermosensitive recording medium of the present invention is considered to be remarkably useful as a rewritable recording medium.

Japanese Patent Application No. 07-266186 filed on Sep. 21, 1995, and Japanese Patent Application filed on Sep. 3, 1996 are hereby incorporated by reference.

What is claimed is:

1. A reversible thermosensitive coloring composition, comprising: (a) an electron-donating coloring compound and (b) an electron-accepting compound, which is an aromatic carboxylic acid compound comprising at least one aliphatic hydrocarbon main chain moiety having at least 11 non-aromatic carbon atoms, which induces color formation in said electron-donating coloring compound; wherein said composition reversibly assumes a color-developed state or a decolorized state, in response to at least one of (1) the temperature of said reversible thermosensitive coloring composition when heated and (2) the cooling rate of said reversible thermosensitive coloring composition when cooled after the heating thereof.

2. The reversible thermosensitive coloring composition as claimed in claim 1, wherein said aromatic carboxylic acid compound is represented by formula (I):

(I)

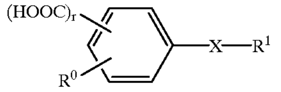

wherein r is an integer of 1 or 2; X is a bivalent group comprising at least one moiety selected from the group consisting of —NH—, —O—, —S—, —CO—, —CS— and —$SO_2$—; $R^0$ is hydroxyl group, an alkyl group having 1 to 6 carbon atoms, an alkoxyl group having 1 to 6 carbon atoms, a halogen atom, or a hydrogen atom; and $R^1$ is an unsubstituted or substituted hydrocarbon group comprising an aliphatic hydrocarbon main chain moiety having at least 11 non-aromatic carbon atoms.

3. The reversible thermosensitive coloring composition as claimed in claim 2, wherein said aliphatic hydrocarbon main chain moiety further comprises an aromatic ring.

4. The reversible thermosensitive coloring composition as claimed in claim 2, wherein said hydrocarbon group represented by $R^1$ has a substituent selected from the group consisting of hydroxyl group, a halogen atom and an alkoxyl group.

5. The reversible thermosensitive coloring composition as claimed in claim 1, wherein said aromatic carboxylic acid compound is represented by formula (II):

(II)

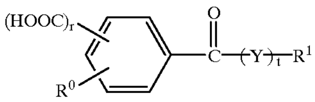

wherein r is an integer of 1 or 2; t is an integer of 0 or 1; Y is a bivalent group comprising at least one moiety selected from the group consisting of —NH—, —S—, —CO—, —CS— and —$SO_2$; $R^0$ is hydroxyl group, an alkyl group having 1 to 6 carbon atoms, an alkoxyl group having 1 to 6 carbon atoms, a halogen atom, or a hydrogen atom; and $R^1$ is an unsubstituted or substituted hydrocarbon group comprising an aliphatic hydrocarbon main chain moiety having at least 11 non-aromatic carbon atoms.

6. The reversible thermosensitive coloring composition as claimed in claim 5, wherein said aliphatic hydrocarbon main chain moiety further comprises an aromatic ring.

7. The reversible thermosensitive coloring composition as claimed in claim 6, wherein said hydrocarbon group represented by $R^1$ has a substituent selected from the group consisting of hydroxyl group, a halogen atom and an alkoxyl group.

8. The reversible thermosensitive coloring composition as claimed in claim 1, wherein said aromatic carboxylic acid compound is represented by formula (III):

(III)

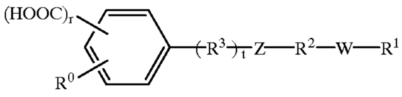

wherein r is an integer of 1 or 2; t is an integer of 0 or 1; Z and W are each independently a bivalent hetero-atom-containing group; $R^0$ is hydroxyl group, an alkyl group having 1 to 6 carbon atoms, an alkoxyl group having 1 to 6 carbon atoms, a halogen atom, or a hydrogen atom; and $R^1$, $R^2$ and $R^3$ are each independently an unsubstituted or substituted hydrocarbon group.

9. The reversible thermosensitive coloring composition as claimed in claim 8, wherein said aliphatic hydrocarbon main chain moiety further comprises an aromatic ring.

10. The reversible thermosensitive coloring composition as claimed in claim 8, wherein said hydrocarbon group represented by $R^1$, $R^2$ or $R^3$ has a substituent selected from the group consisting of hydroxyl group, a halogen atom and an alkoxyl group.

11. The reversible thermosensitive coloring composition as claimed in claim 8, wherein said bivalent hetero-atom-containing group represented by Z or W is selected from the group consisting of —NH—, —O—, —S—, —CO—, —CS— and —$SO_2$—.

* * * * *

UNITED STATES PATENT AND TRADEMARK OFFICE

CERTIFICATE OF CORRECTION

PATENT NO. : 6,063,173

DATED : May 16, 2000

INVENTOR(S): Masafumi TORII, et al.

It is certified that an error appears in the above-identified patent and that said Letters Patent is hereby corrected as shown below:

Column 5, lines 25 through 34, "

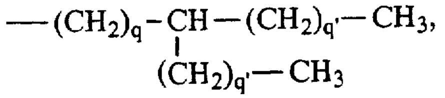

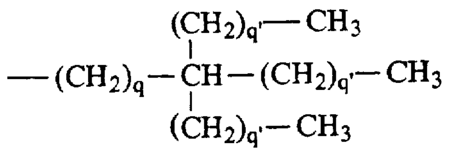

and

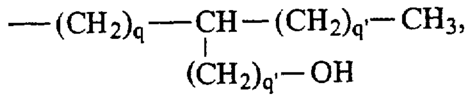

"

should read --

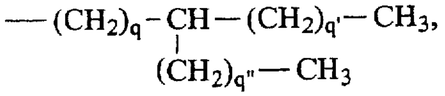

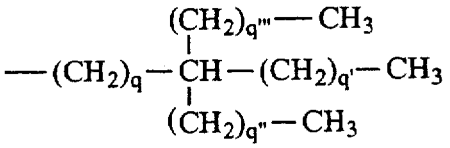

and

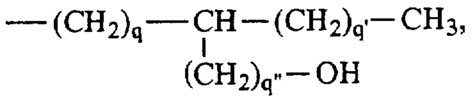

--.

UNITED STATES PATENT AND TRADEMARK OFFICE

CERTIFICATE OF CORRECTION

PATENT NO. : 6,063,173

DATED : May 16, 2000

INVENTOR(S): Masafumi TORII, et al.

It is certified that an error appears in the above-identified patent and that said Letters Patent is hereby corrected as shown below:

Column 9, line 54, "

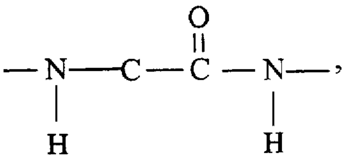

"

should read, —

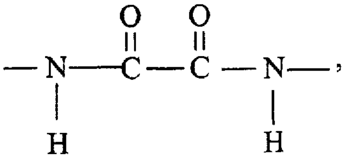

--.

UNITED STATES PATENT AND TRADEMARK OFFICE

CERTIFICATE OF CORRECTION

PATENT NO. : 6,063,173

DATED : May 16, 2000

INVENTOR(S): Masafumi TORII, et al.

It is certified that an error appears in the above-identified patent and that said Letters Patent is hereby corrected as shown below:

Column 13, lines 56 through 66, "

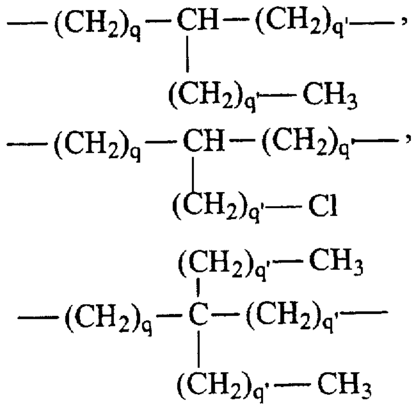

and "

should be --

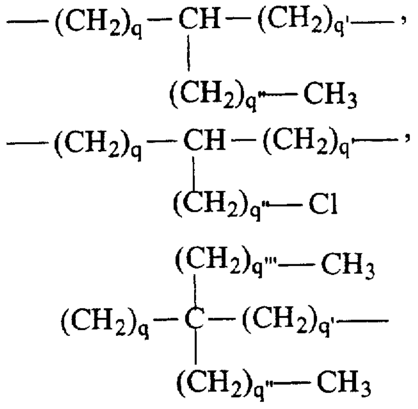

and --.

UNITED STATES PATENT AND TRADEMARK OFFICE

CERTIFICATE OF CORRECTION

PATENT NO. : 6,063,173

DATED : May 16, 2000

INVENTOR(S): Masafumi TORII, et al.

It is certified that an error appears in the above-identified patent and that said Letters Patent is hereby corrected as shown below:

Column 14, lines 1 through 4, "

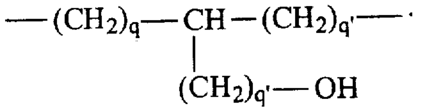

"

should be --

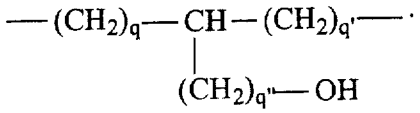

--.

Column 65, line 40,"can be firmed" should read --can be formed--.

Signed and Sealed this

Fifteenth Day of May, 2001

Attest:

NICHOLAS P. GODICI

*Attesting Officer*

*Acting Director of the United States Patent and Trademark Office*